(12) United States Patent
Yao et al.

(10) Patent No.: US 11,294,675 B2
(45) Date of Patent: Apr. 5, 2022

(54) WRITING PREFETCHED DATA INTO INTRA-CORE CACHES OF CORES IDENTIFIED BY PREFETCHING INSTRUCTIONS

(71) Applicant: Huawei Technologies Co., Ltd., Shenzhen (CN)

(72) Inventors: Jun Yao, London (GB); Yasuhiko Nakashima, Nara (JP); Tao Wang, Beijing (CN); Wei Zhang, Shenzhen (CN); Zuqi Liu, Shenzhen (CN); Shuzhan Bi, Shenzhen (JP)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 16/677,816

(22) Filed: Nov. 8, 2019

(65) Prior Publication Data
US 2020/0073665 A1 Mar. 5, 2020

Related U.S. Application Data

(63) Continuation of application No. PCT/CN2017/083523, filed on May 8, 2017.

(51) Int. Cl.
*G06F 9/312* (2018.01)
*G06F 9/30* (2018.01)
*G06F 12/0862* (2016.01)
*G06F 13/16* (2006.01)

(52) U.S. Cl.
CPC ...... *G06F 9/30047* (2013.01); *G06F 12/0862* (2013.01); *G06F 13/1668* (2013.01)

(58) Field of Classification Search
CPC .................................................. G06F 9/30047
See application file for complete search history.

(56) References Cited

U.S. PATENT DOCUMENTS

| | | | | |
|---|---|---|---|---|
| 5,796,971 | A | * 8/1998 | Emberson | G06F 9/3802 711/122 |
| 6,131,145 | A | * 10/2000 | Matsubara | G06F 9/383 711/122 |
| 2007/0174555 | A1 | * 7/2007 | Burtscher | G06F 9/3832 711/137 |
| 2008/0282038 | A1 | 11/2008 | Sethuraman et al. | |
| 2009/0198976 | A1 | * 8/2009 | Austel | G06F 9/3012 712/225 |

(Continued)

FOREIGN PATENT DOCUMENTS

| CN | 1947424 A | 4/2007 |
|---|---|---|
| CN | 102446087 A | 5/2012 |
| CN | 104484286 A | 4/2015 |

OTHER PUBLICATIONS

Machine Translation and Abstract of Chinese Publication No. CN102446087, May 9, 2012, 18 pages.

(Continued)

*Primary Examiner* — David J. Huisman
(74) *Attorney, Agent, or Firm* — Conley Rose, P.C.

(57) ABSTRACT

A method for accessing a memory of a multi-core system, a related apparatus, a system, and a storage medium involve obtaining data from a system memory according to a prefetch instruction, and sending a message to a core that carries the to-be-accessed data. Each segment of data is stored in an intra-core cache based on the prefetch instruction.

20 Claims, 14 Drawing Sheets

(56) References Cited

U.S. PATENT DOCUMENTS

2009/0328047 A1    12/2009  Li et al.
2011/0093687 A1*    4/2011  Chen .................. G06F 12/0862
                                                    712/225
2011/0231612 A1*    9/2011  Karlsson ............. G06F 12/0862
                                                    711/119

OTHER PUBLICATIONS

Machine Translation and Abstract of Chinese Publication No. CN104484286, Apr. 1, 2015, 13 pages.
Foreign Communication From a Counterpart Application, PCT Application No. PCT/CN2017/083523, English Translation of International Search Report dated Feb. 7, 2018, 2 pages.

* cited by examiner

WRITING PREFETCHED DATA INTO INTRA-CORE CACHES OF CORES IDENTIFIED BY PREFETCHING INSTRUCTIONS

CROSS-REFERENCE TO RELATED APPLICATION

This application is a continuation of International Application No. PCT/CN2017/083523, filed on May 8, 2017, the disclosure of which is hereby incorporated by reference in its entirety.

TECHNICAL FIELD

This application relates to the field of wireless communications technologies, and in particular, to a method for accessing a memory of a multi-core system and to a related apparatus, a system, and a storage medium.

BACKGROUND

With the development of computer technologies, multi-core systems are more widely applied to products. For example, a multi-core processor is widely applied to a plurality of fields, such as servers, notebook computers, gaming platforms, and high-performance multimedia applications. In addition, with the development of information technologies, data generated by an information system increases explosively in scale and is highly complex in mode. The world has entered the big data era. High concurrency based on parallel threads and tasks in an architecture of a multi-core system is a main solution for dealing with massive data at present. However, working efficiency of a processor and working efficiency of a memory system are not improved at a same pace. A dominant frequency of a processor greatly increases at a rate of 60 percent (%) per year, but a working frequency of a memory chip increases only by an average of 10% per year. Therefore, with the development of a multi-core system, fetch performance gradually becomes an important factor that affects processor performance.

An intra-core cache usually includes a high-speed but expensive storage module and is configured to access data at a high speed during computation by a processor. A working principle of the intra-core cache is as follows. When the processor needs to read one piece of data, the intra-core cache is first searched. If the data is found, the data is read immediately and is sent to the processor for processing, if the data is not found, the data is read from a memory using relatively high access time overheads and is sent to the processor for processing, and a data block in which the data is located is read into the intra-core cache, so that data in the entire block can be read from the intra-core cache subsequently without invoking the memory again.

To increase a rate of the processor, a plurality of concurrent threads are usually used to prefetch to-be-processed data to the intra-core cache, so that the processor directly reads the data from the intra-core cache, thereby reducing data access time overheads. For example, a first operation in which computation is performed based on only a single element is as follows:

for (i=0,i<256,i++),
B[i]=A[i]*8.

In the foregoing first operation, a progression A[i] may be divided into a plurality of blocks, and each block of data is correspondingly prefetched to an intra-core cache of a respective core of a multi-core system, thereby increasing a computation rate of the multi-core system.

However, for example, a second operation in which computation needs to be performed based on a plurality of elements is as follows:

for(i=0,i<256,i++),
B[i]=A[i+1]+A[i].

In the foregoing second operation, if a progression A[i] is still divided into a plurality of blocks, and each block of data is correspondingly prefetched to a respective intra-core cache of the multi-core system, when some edge data is computed, some problems may occur. For example, A[0] to A[3] are stored in a first intra-core cache, and A[4] to A[7] are stored in a second intra-core cache. When B[3] is computed, A[3] and A[4] need to be read.

Each core performs an operation independently. For example, a first core determines, through computation mapping, data that needs to be placed in a first intra-core cache of the first core, the first core generates a corresponding memory access request, and the first core sends the memory access request to a memory controller, thereby actively prefetching the data from a system memory to the first intra-core cache. Correspondingly, when a second core determines, through computation mapping, data that needs to be placed in a second intra-core cache of the second core, to-be-prefetched data is actively prefetched to the second intra-core cache of the second core. In this process, a core determines, through computation mapping, a part of data that needs to be placed in an intra-core cache of the core. This is an independent computation process, and other cores do not know which data is placed in the intra-core cache of the core.

In the foregoing example, when the first core needs to read A[3] and A[4] for computation, the first core does not know A[4] is stored in which intra-core cache. In this case, the first core needs to prefetch the data A[4] from the memory to the first intra-core cache again. It can be learned that, each core operates independently in the memory access method. Consequently, data may be prefetched repeatedly, and time overheads of an entire data processing process are increased.

SUMMARY

Embodiments of this application provide a method for accessing a memory of a multi-core system, a related apparatus, a system, and a storage medium, to gain overall control over prefetched data by reconstructing a prefetch instruction, thereby preventing repeated data prefetching and reducing time overheads of an entire data processing process.

According to a first aspect, an embodiment of this application provides a multi-core system, and the multi-core system includes a prefetch module, a memory controller, a system memory, and a plurality of cores. The prefetch module is configured to send a first prefetch instruction to the memory controller, where the first prefetch instruction includes an identifier of a first core, the memory controller is configured to, obtain first data from the system memory according to the first prefetch instruction, and send a first feedback message to the first core, where the first feedback message carries the first data, and the first core is configured to write the first data into an intra-core cache of the first core. Data prefetching can be completed by the prefetch module by sending a prefetch instruction, and the prefetch instruction includes an identifier of a core. Therefore, each segment of data is stored in an intra-core cache of which core can be learned using the prefetch instruction. This implements overall control over prefetched data, thereby preventing repeated data prefetching and reducing time overheads of an entire data processing process.

In an optional implementation, a prefetch instruction further includes a data length of data that needs to be prefetched using the prefetch instruction. For example, the first prefetch instruction further includes a data length of the first data, so that when the first data is prefetched according to the first prefetch instruction, a stipulation that data in a length of one cache line is prefetched each time can be broken. In this embodiment of this application, because the data length of the first data is clearly indicated, data longer or shorter than one cache line can be prefetched.

In an optional implementation, the memory controller is further configured to, after receiving the first prefetch instruction, set a memory channel to a busy state, and after obtaining the first data of the data length from the system memory according to the first prefetch instruction, set the memory channel to an idle state. In this way, the first data can be prefetched to the intra-core cache in one time, and then the memory channel is handed over to and used by another core. This avoids a problem of frequently contending for the memory channel, thereby further saving a data prefetching time. There are a plurality of specific manners of setting the memory channel, for example, by setting a bit value of a burst_mode bit. When the bit value of the burst_mode bit is 0, it indicates that the memory channel is idle. When the bit value of the burst_mode bit is 1, it indicates that the memory channel is busy.

To further improve overall control over data and more accurately learn a storage location of prefetched data, optionally, the first prefetch instruction further includes a cache bank identifier, the first feedback message further includes the cache bank identifier, and the first core is configured to write the first data into a cache bank indicated by the cache bank identifier.

In this embodiment of this application, data in the system memory is correspondingly stored in a respective intra-core cache using a prefetch instruction, and the prefetch instruction includes an identifier of a core. Therefore, which data is stored in which core can be learned from an overall perspective, and a computation operation can be performed based on data in the plurality of cores. In addition, in the multi-core system, during N rounds of computation operations, new data that needs to be used in a next round may be prefetched while a current round of computation is performed, thereby increasing a data processing speed. Optionally, a multi-core processor is configured to perform a computation operation based on the first data, when the multi-core processor performs the computation operation based on the first data, the prefetch module is further configured to send a second prefetch instruction to the memory controller, where the second prefetch instruction includes an identifier of a second core, and the second prefetch instruction is used to prefetch second data in the system cache to an intra-core cache of the second core, and the multi-core processor is configured to perform N rounds of computation operations, where the first data and the second data are used in a next round of computation operation of the multi-core processor, and N is an integer greater than 1.

A specific process of prefetching the second data is similar to a process of prefetching the first data. In an embodiment, the prefetch module is further configured to send the second prefetch instruction to the memory controller, where the second prefetch instruction includes the identifier of the second core, the memory controller is further configured to obtain the second data from the system memory according to the second prefetch instruction, and send a second feedback message to the second core, where the second feedback message carries the second data, and the second core is configured to write the second data into the intra-core cache of the second core.

In another optional embodiment, the multi-core system further includes P first in first out (FIFO) registers, and each of the P FIFO registers can store P data elements, and if the multi-core processor needs to perform a computation operation based on P consecutive data elements in the first data, the first core is further configured to write the P data elements respectively into the P FIFO registers, and the multi-core processor is further configured to obtain the P consecutive data elements in the first data by reading different data bits in the P FIFO registers in parallel, and perform the computation operation based on the P data elements. In this way, when a plurality of data elements need to be read from an intra-core cache of a core, it is unnecessary to generate a plurality of read commands to respectively read the plurality of data elements. Instead, only one read instruction is generated, and the plurality of data elements are respectively read from the P FIFO registers according to the read instruction, thereby further reducing data processing time overheads.

According to a second aspect, an embodiment of this application provides a method for accessing a memory of a multi-core system. The multi-core system includes a prefetch module and a plurality of cores, and the method includes sending, by the prefetch module, a prefetch instruction to a memory controller, where the prefetch instruction includes an identifier of a core, receiving, by the core, a feedback message from the memory controller, where the feedback message includes prefetched data, and writing, by the core, the prefetched data into an intra-core cache of the core. Data prefetching can be completed by the prefetch module by sending a prefetch instruction, and the prefetch instruction includes an identifier of a core. Therefore, each segment of data is stored in an intra-core cache of which core can be learned using the prefetch instruction. This implements overall control over prefetched data, thereby preventing repeated data prefetching and reducing time overheads of an entire data processing process.

Optionally, the prefetch instruction further includes a data length of the prefetched data. Optionally, the prefetch instruction further includes a cache bank identifier, and the feedback message further includes the cache bank identifier, and the writing, by the core, the prefetched data into an intra-core cache of the core includes writing, by the core, the prefetched data into a cache bank indicated by the cache bank identifier. In this way, the prefetched data can be prefetched to the intra-core cache in one time, and then a memory channel is handed over to and used by another core. This avoids a problem of frequently contending for the memory channel, thereby further saving a data prefetching time.

Optionally, the multi-core system further includes P first in first out FIFO registers, and each of the P FIFO registers can store P data elements, and after the writing, by the core, the prefetched data into an intra-core cache of the core, the method further includes writing, by the core, P consecutive data elements respectively into the P FIFO registers, where the P FIFO registers are configured to enable a multi-core processor to obtain the P data elements by reading different data bits in the P FIFO registers in parallel and perform a computation operation based on the P data elements. In this way, when a plurality of data elements need to be read from an intra-core cache of a core, it is unnecessary to generate a plurality of read commands to respectively read the plurality of data elements. Instead, only one read instruction is generated, and the plurality of data elements are respectively read from the P FIFO registers according to the read instruction, thereby further reducing data processing time overheads.

According to a third aspect, an embodiment of this application provides a method for accessing a memory of a multi-core system. The method includes receiving, by a memory controller, a prefetch instruction sent by a prefetch module, where the prefetch instruction includes an identifier of a core, obtaining, by the memory controller, prefetched data from a system memory according to the prefetch instruction, and sending, by the memory controller, a feedback message to the core, where the feedback message carries the prefetched data.

Optionally, the prefetch instruction further includes a data length of the prefetched data. Data prefetching can be completed by the prefetch module by sending a prefetch instruction, and the prefetch instruction includes an identifier of a core. Therefore, each segment of data is stored in an intra-core cache of which core can be learned using the prefetch instruction. This implements overall control over prefetched data, thereby preventing repeated data prefetching and reducing time overheads of an entire data processing process.

In an optional implementation solution, the obtaining, by the memory controller, prefetched data from a system memory according to the prefetch instruction includes: setting, by the memory controller, a memory channel to a busy state, and obtaining, by the memory controller, the prefetched data from the system memory according to the prefetch instruction, and after obtaining the prefetched data of the data length, setting the memory channel to an idle state. In this way, first data can be prefetched to the intra-core cache in one time, and then the memory channel is handed over to and used by another core. This avoids a problem of frequently contending for the memory channel, thereby further saving a data prefetching time.

To further improve overall control over data and more accurately learn a storage location of prefetched data, optionally, the prefetch instruction further includes a cache bank identifier, the feedback message further includes the cache bank identifier, and the cache bank identifier is used to enable the core to write the prefetched data into a cache bank indicated by the cache bank identifier. Each intra-core cache includes at least one cache bank.

According to a fourth aspect, an embodiment of this application provides a multi-core processor. The multi-core processor includes a plurality of cores, and each core includes a memory, a transceiver, and a processor. The memory is configured to store an instruction, the processor is configured to execute the instruction stored in the memory and control the transceiver to receive a signal and send a signal, and when the processor executes the instruction stored in the memory, the core is configured to perform the foregoing second aspect or any method in the second aspect.

According to a fifth aspect, an embodiment of this application provides a memory controller, and the memory controller includes a memory, a transceiver, and a processor. The memory is configured to store an instruction, the processor is configured to execute the instruction stored in the memory and control the transceiver to receive a signal and send a signal, and when the processor executes the instruction stored in the memory, the memory controller is configured to perform the foregoing third aspect or any method in the third aspect.

According to a sixth aspect, an embodiment of this application provides a multi-core processor, configured to implement the foregoing second aspect or any method in the second aspect, and including corresponding function modules that are respectively configured to implement the steps in the foregoing method.

According to a seventh aspect, an embodiment of this application provides a memory controller, configured to implement the foregoing third aspect or any method in the third aspect, and including corresponding function modules that are respectively configured to implement the steps in the foregoing method.

According to an eighth aspect, an embodiment of this application provides a computer storage medium that stores an instruction, and when the instruction runs on a computer, the computer performs the method according to any one of the second aspect or the possible implementations of the second aspect.

According to a ninth aspect, an embodiment of this application provides a computer storage medium that stores an instruction, and when the instruction runs on a computer, the computer performs the method according to any one of the third aspect or the possible implementations of the third aspect.

According to a tenth aspect, an embodiment of this application provides a computer program product that includes an instruction, and when the instruction runs on a computer, the computer performs the method according to any one of the second aspect or the possible implementations of the second aspect.

According to an eleventh aspect, an embodiment of this application provides a computer program product that includes an instruction, and when the instruction runs on a computer, the computer performs the method according to any one of the third aspect or the possible implementations of the third aspect.

In the embodiments of this application, the prefetch module is configured to send the first prefetch instruction to the memory controller, where the first prefetch instruction includes the identifier of the first core, the memory controller is configured to obtain the first data from the system memory according to the first prefetch instruction, and send the first feedback message to the first core, where the first feedback message carries the first data, and the first core is configured to write the first data into the intra-core cache of the first core. Data prefetching can be completed by the prefetch module by sending a prefetch instruction, and the prefetch instruction includes an identifier of a core. Therefore, each segment of data is stored in an intra-core cache of which core can be learned using the prefetch instruction. This implements overall control over prefetched data, thereby preventing repeated data prefetching and reducing time overheads of an entire data processing process.

BRIEF DESCRIPTION OF DRAWINGS

FIG. 1A-1 and FIG. 1A-2 are schematic diagrams of an architecture of another multi-core system according to an embodiment of this application.

FIG. 2 is a schematic flowchart of a method for accessing a memory of a multi-core system according to an embodiment of this application.

DESCRIPTION OF EMBODIMENTS

Figure 1:
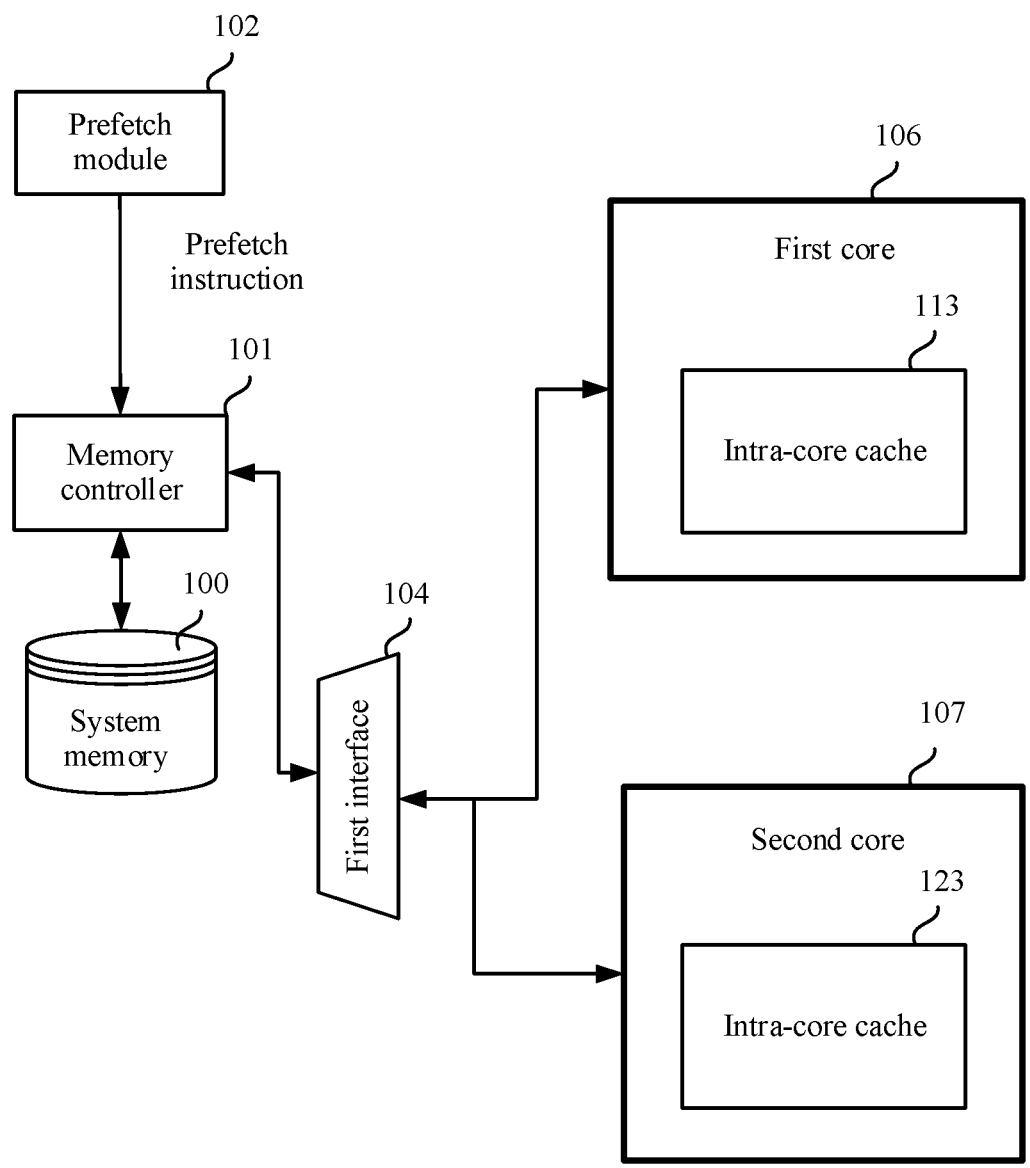
FIG. 1 is a schematic diagram of an architecture of a multi-core system according to an embodiment of this application.

FIG. 1 is an example schematic diagram of an architecture of a multi-core system according to an embodiment of this application. As shown in FIG. 1, the multi-core system in this embodiment of this application includes a system memory 100, a memory controller 101, a prefetch module 102, a plurality of cores, and an intra-core cache of each of the plurality of cores. For example, the plurality of cores include a first core 106 and a second core 107 shown in FIG. 1. The first core includes an intra-core cache 113, and the second core includes an intra-core cache 123. The system memory 100 is connected to the memory controller 101, and the memory controller 101 is connected to the prefetch module 102. The memory controller is connected to each core. Optionally, the memory controller 101 may be connected to each core through a first interface 104. In this embodiment of this application, the prefetch module 102 may be a module in a core of a multi-core processor, or may be a module in another processor.

In the system provided in this embodiment of this application, the prefetch module 102 is configured to send a first prefetch instruction to the memory controller 101, where the first prefetch instruction includes an identifier of the first core 106, the memory controller 101 is configured to obtain first data from the system memory 100 according to the first prefetch instruction, and send a first feedback message to the first core 106, where the first feedback message carries the first data, and the first core 106 is configured to write the first data into the intra-core cache of the first core 106.

Data prefetching can be completed by the prefetch module by sending a prefetch instruction, and the prefetch instruction includes an identifier of a core. Therefore, each segment of data is stored in an intra-core cache of which core can be learned using the prefetch instruction. This implements overall control over prefetched data, thereby preventing repeated data prefetching and reducing time overheads of an entire data processing process.

In an optional implementation solution, the memory controller 101 is further configured to, after receiving the first prefetch instruction, set a memory channel to a busy state, and after obtaining the first data of a data length from the system memory 100 according to the first prefetch instruction, set the memory channel to an idle state. In this way, the first data can be prefetched to the intra-core cache in one time, and then the memory channel is handed over to and used by another core. This avoids a problem of frequently contending for the memory channel, thereby further saving a data prefetching time.

In an optional implementation, a prefetch instruction further includes a data length of data that needs to be prefetched using the prefetch instruction. For example, the first prefetch instruction further includes the data length of the first data, so that when the first data is prefetched according to the first prefetch instruction, a stipulation that data in a length of one cache line is prefetched each time can be broken. In this embodiment of this application, because the data length of the first data is clearly indicated, data longer or shorter than one cache line can be prefetched.

To further improve overall control over data and more accurately learn a storage location of prefetched data, optionally, the first prefetch instruction further includes a cache bank identifier, the first feedback message further includes the cache bank identifier, and the first core 106 is configured to write the first data into a cache bank indicated by the cache bank identifier. Each intra-core cache includes at least one cache bank. There are a plurality of specific manners of setting the memory channel, for example, by setting a bit value of a burst_mode bit. When the bit value of the burst_mode bit is 0, it indicates that the memory channel is idle. When the bit value of the burst_mode bit is 1, it indicates that the memory channel is busy.

In this embodiment of this application, data in the system memory is correspondingly stored in a respective intra-core cache using a prefetch instruction, and the prefetch instruction includes an identifier of a core. Therefore, which data is stored in which core can be learned from an overall perspective, and a computation operation can be performed based on data in the plurality of cores. In addition, in the multi-core system, during N rounds of computation operations, new data that needs to be used in a next round may be prefetched while a current round of computation is performed, thereby increasing a data processing speed. Optionally, a multi-core processor is configured to perform a computation operation based on the first data, when the multi-core processor performs the computation operation based on the first data, the prefetch module is further configured to send a second prefetch instruction to the memory controller, where the second prefetch instruction includes an identifier of a second core, and the second prefetch instruction is used to prefetch second data in the system cache to an intra-core cache of the second core, and the multi-core processor is configured to perform N rounds of computation operations, where the first data and the second data are used in a next round of computation operation of the multi-core processor, and N is an integer greater than 1.

In addition, in this embodiment of this application, when a round of computation needs to be performed based on a plurality of pieces of data, the plurality of pieces of data may be respectively prefetched to the plurality of cores, and one piece of data is prefetched to one core. In this way, because overall control over data can be exerted using a prefetch instruction in this embodiment of this application, a core in which each piece of prefetched data is stored can be learned when computation is performed based on prefetched data, so that a round of computation can be performed by directly reading the pieces of prefetched data from different cores, thereby preventing repeated data prefetching and further reducing data processing time overheads.

In another optional embodiment, the multi-core system further includes P FIFO registers, and each of the P FIFO registers can store P data elements. If the multi-core processor needs to perform a computation operation based on P consecutive data elements in the first data, the first core 106 is further configured to write the P data elements respectively into the P FIFO registers, and the multi-core processor is further configured to obtain the P consecutive data elements in the first data by reading different data bits in the P FIFO registers in parallel, and perform the computation operation based on the P data elements. In this way, when a plurality of data elements need to be read from an intra-core cache of a core, it is unnecessary to generate a plurality of read commands to respectively read the plurality of data elements. Instead, only one read instruction is generated, and the plurality of data elements are respectively read from the P FIFO registers according to the read instruction, thereby further reducing data processing time overheads.

Figures 1, 1A:
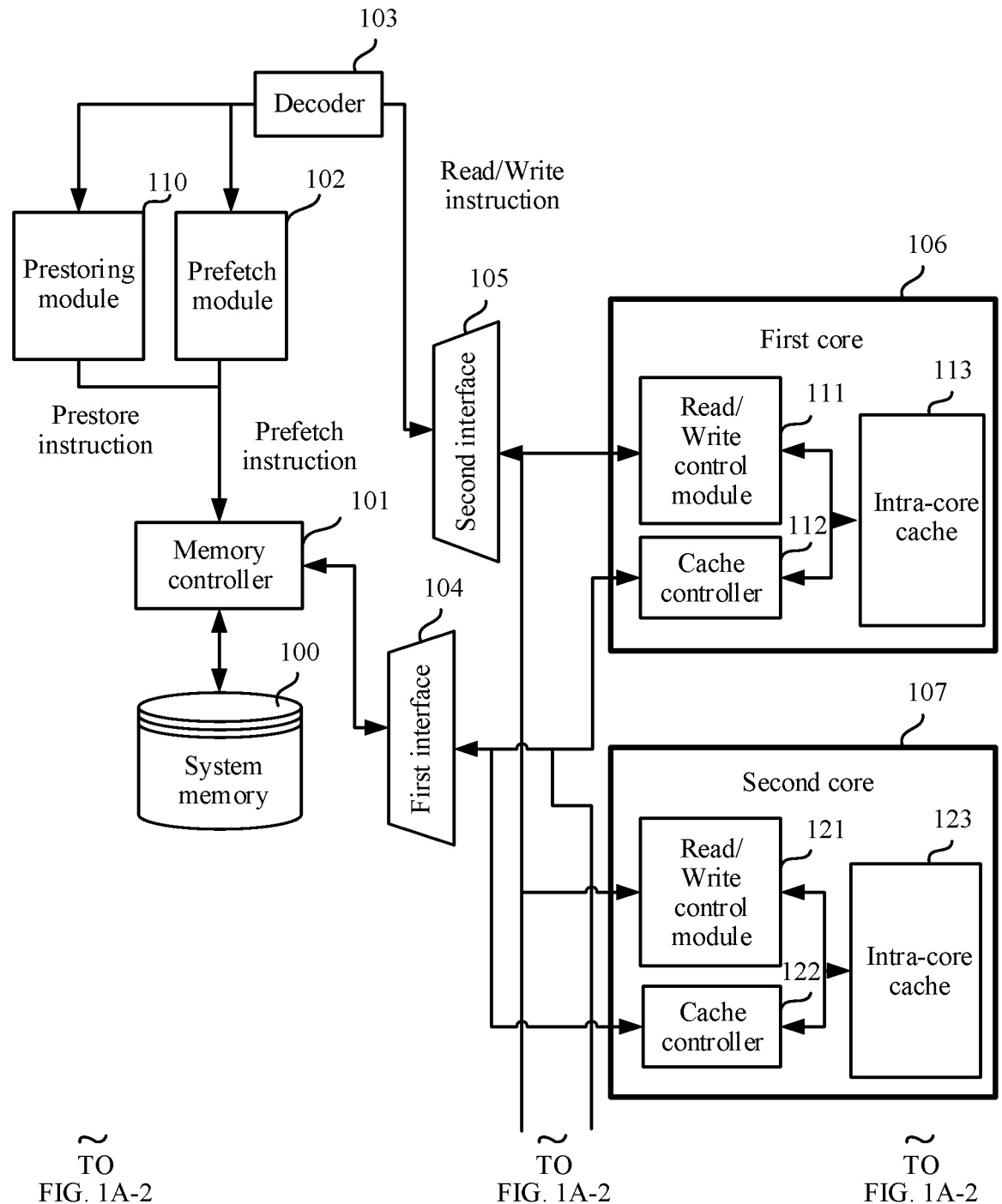
Figures 1, 1A, 2:
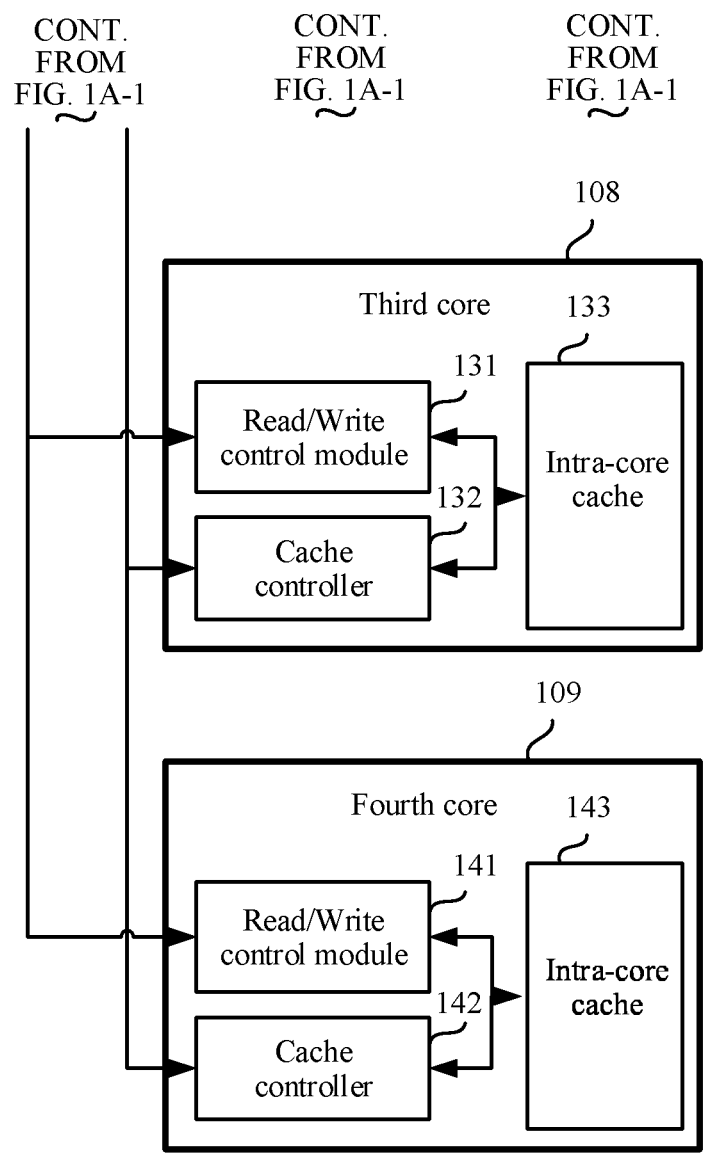

Based on the same concept and the foregoing descriptions, an embodiment of this application further provides a schematic diagram of an architecture of another multi-core system. FIG. 1A-1 and FIG. 1A-2 are example schematic diagrams of the architecture of the another multi-core system. As shown in FIG. 1A-1 and FIG. 1A-2, the multi-core system in this embodiment of this application includes a system memory 100, a memory controller 101, a prefetch module 102, a plurality of cores, and an intra-core cache of each of the plurality of cores. The system memory 100 is connected to the memory controller 101, and the memory controller 101 is connected to the prefetch module 102. The prefetch module 102 may be connected to a decoder 103. Optionally, the prefetch module 102 may be configured to send a prefetch instruction to the memory controller 101, where the prefetch instruction may be sent by the decoder to the prefetch module or may be generated by the prefetch module. The memory controller 101 sends prefetched data from the system memory 100 to a core according to the prefetch instruction, and the core writes the received data into an intra-core cache. The prefetch instruction includes an identifier of the core. Optionally, the multi-core system further includes a prestoring module 110. The prestoring module 110 prestores data from the intra-core cache of each core to the system memory 100 through a first interface 104 under control of the memory controller 101. In this embodiment of this application, each of the prefetch module 102 and the prestoring module 110 may be a module in a core processor of a multi-core processor, or may be a module in another processor.

In addition, optionally, the decoder 103 may transmit a decoded read/write instruction to a read/write control module in each core through a second interface 105, so that the read/write control module in each core reads data from each intra-core cache or writes data into each intra-core cache.

In FIG. 1A-1, the first interface 104 and the second interface 105 are drawn as two interfaces. In an actual operation, the first interface 104 and the second interface 105 may be a same interface or may be two different interfaces, for example, a demultiplexer DMUX1 interface and a demultiplexer DMUX2 interface. If the first interface 104 and the second interface 105 are two different interfaces, the second interface 105 transmits a read/write instruction, and the first interface 104 may transmit prefetched/prestored data, thereby increasing an instruction transmission rate of the second interface 105.

As shown in FIG. 1 and FIG. 1A-1 and FIG. 1A-2, the multi-core system includes at least two cores, and FIG. 1A-1 and FIG. 1A-2 show only four cores as an example. In this embodiment of this application, an intra-core cache and a logical control system corresponding to the intra-core cache may be referred to as a core system in terms of logical function. In this embodiment of this application, one core correspondingly uses one intra-core cache to perform prefetching, prestoring, reading, or writing, for example, an intra-core cache 113 in a first core 106, an intra-core cache 123 in a second core 107, an intra-core cache 133 in a third core 108, and an intra-core cache 143 in a fourth core 109 that are shown in FIG. 1A-1 and FIG. 1A-2. Optionally, an intra-core cache may include one or more cache banks.

Optionally, each core includes a read/write control module, and the read/write control module is configured to execute a read/write command, to read data from each intra-core cache or write data into each intra-core cache, for example, a read/write control module 111 of the first core 106, a read/write control module 121 of the second core 107, a read/write control module 131 of the third core 108, and a read/write control module 141 of the fourth core 109 that are shown in FIG. 1A-1 and FIG. 1A-2.

Optionally, each core includes a cache controller. The cache controller is configured to execute a prefetch/prestore command to prefetch data from the system memory to each intra-core cache or prestore data from each intra-core cache to the system memory, for example, a cache controller 112 of the first core 106, a cache controller 122 of the second core 107, a cache controller 132 of the third core 108, and a cache controller 142 of the fourth core 109 that are shown in FIG. 1A-1 and FIG. 1A-2.

As shown in FIG. 1A-1 and FIG. 1A-2, a prefetch instruction, for example, a prestore instruction, a read instruction, or a write instruction of this application may be used in a general-purpose multi-core processor or multi-core accelerator. Optionally, an instruction distribution module needs to be added to an outer-layer instruction cache (which is usually a level 3 instruction cache (L3 icache) or an outer-layer uniform cache) of a central processing unit (CPU) or to the memory controller. When determining that an instruction is the prefetch instruction, the prestore instruction, the read instruction, or the write instruction of this application, the instruction distribution module sends the instruction to the decoder 103 in FIG. 1A-1. In some cases, the instruction distribution module sends, using an original path in an original multi-core system, the instruction to an instruction cache of a core to which the thread is loaded.

In this embodiment of this application, an intra-core cache may include one or more cache banks. A cache bank may also be referred to as a cache line or a cache block in English. Each cache bank stores several storage modules whose addresses in the system memory are consecutive. For example, in a 32-bit computer, a cache bank is usually a word (word), namely, four bytes. The system memory in this embodiment of this application may include a double data rate synchronous dynamic random access memory (DRAM) (DDR). A DDR system memory is developed on a basis of a synchronous DRAM (SDRAM) system memory, where x in DDRx may be 2, 3, or 4, each of which represents a different DDR type. A core in this embodiment of this application may include a CPU, a network processor (NP), or a combination of a CPU and an NP. "/" in this embodiment of this application means "or". For example, prefetch/ prestore represents prefetch or prestore, and read/write represents read or write.

Figure 1B:
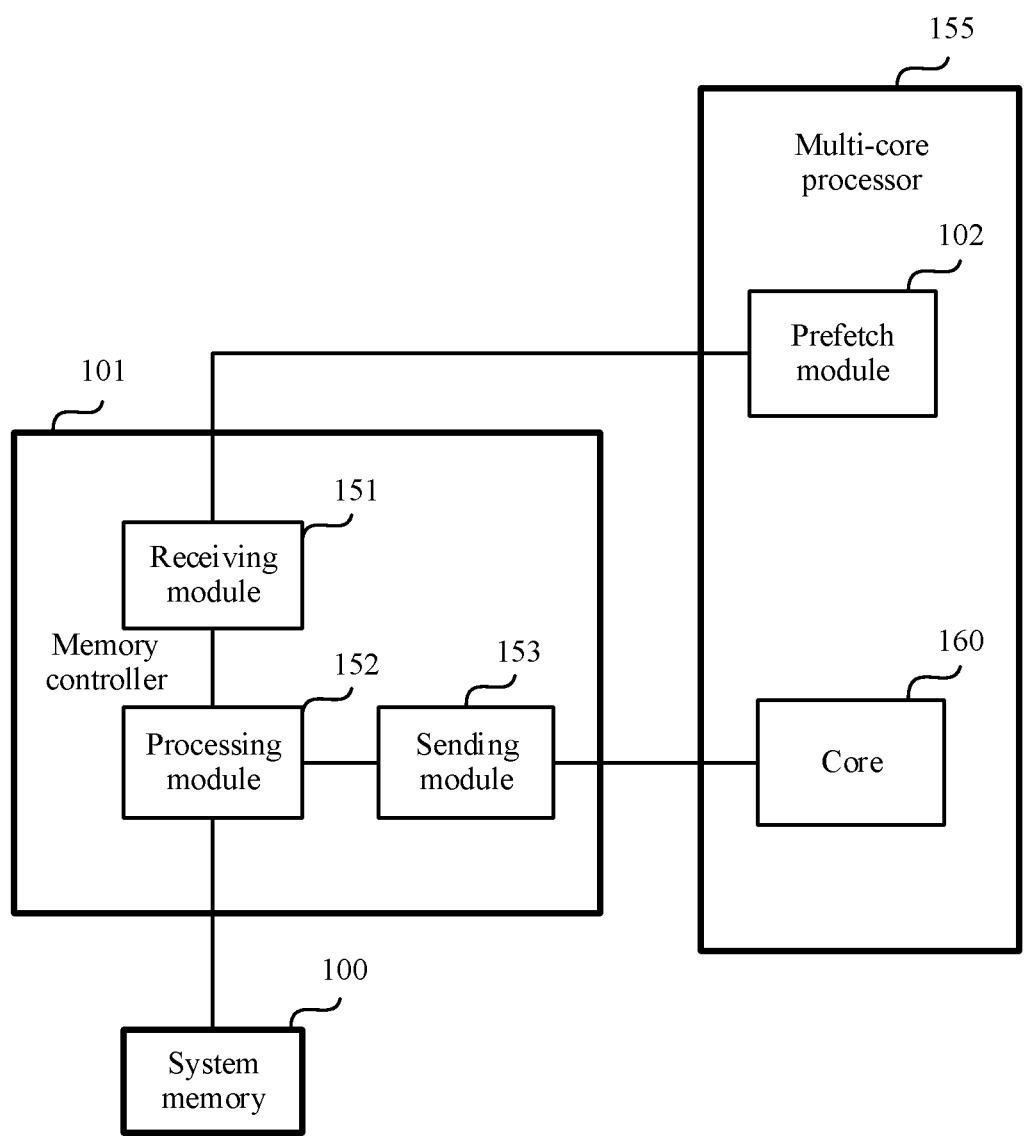
FIG. 1B is a schematic structural diagram of a memory controller according to an embodiment of this application.

Based on the same concept and the foregoing descriptions, an embodiment of this application provides a memory controller. FIG. 1B is an example schematic structural diagram of a memory controller according to an embodiment of this application. As shown in FIG. 1B, a memory controller 101 includes a receiving module 151, a processing module 152, and a sending module 153. The receiving module 151 is configured to receive a prefetch instruction sent by a prefetch module 102, where the prefetch instruction includes an identifier of a core 160. The processing module 152 is configured to obtain prefetched data from a system memory 100 according to the prefetch instruction. The sending module 153 is configured to send a feedback message to the core 160, where the feedback message carries the prefetched data. The core 160 may be any core of a multi-core processor 155, for example, any core of the first core to the fourth core in FIG. 1 and FIG. 1A-1 and FIG. 1A-2.

In another optional solution, the processing module 152 is configured to set a memory channel to a busy state, obtain the prefetched data from the system memory according to the prefetch instruction, and after obtaining the prefetched data of a data length, set the memory channel to an idle state. In this way, first data can be prefetched to an intra-core cache in one time, and then the memory channel is handed over to and used by another core. This avoids a problem of frequently contending for the memory channel, thereby further saving a data prefetching time.

Figure 1C:
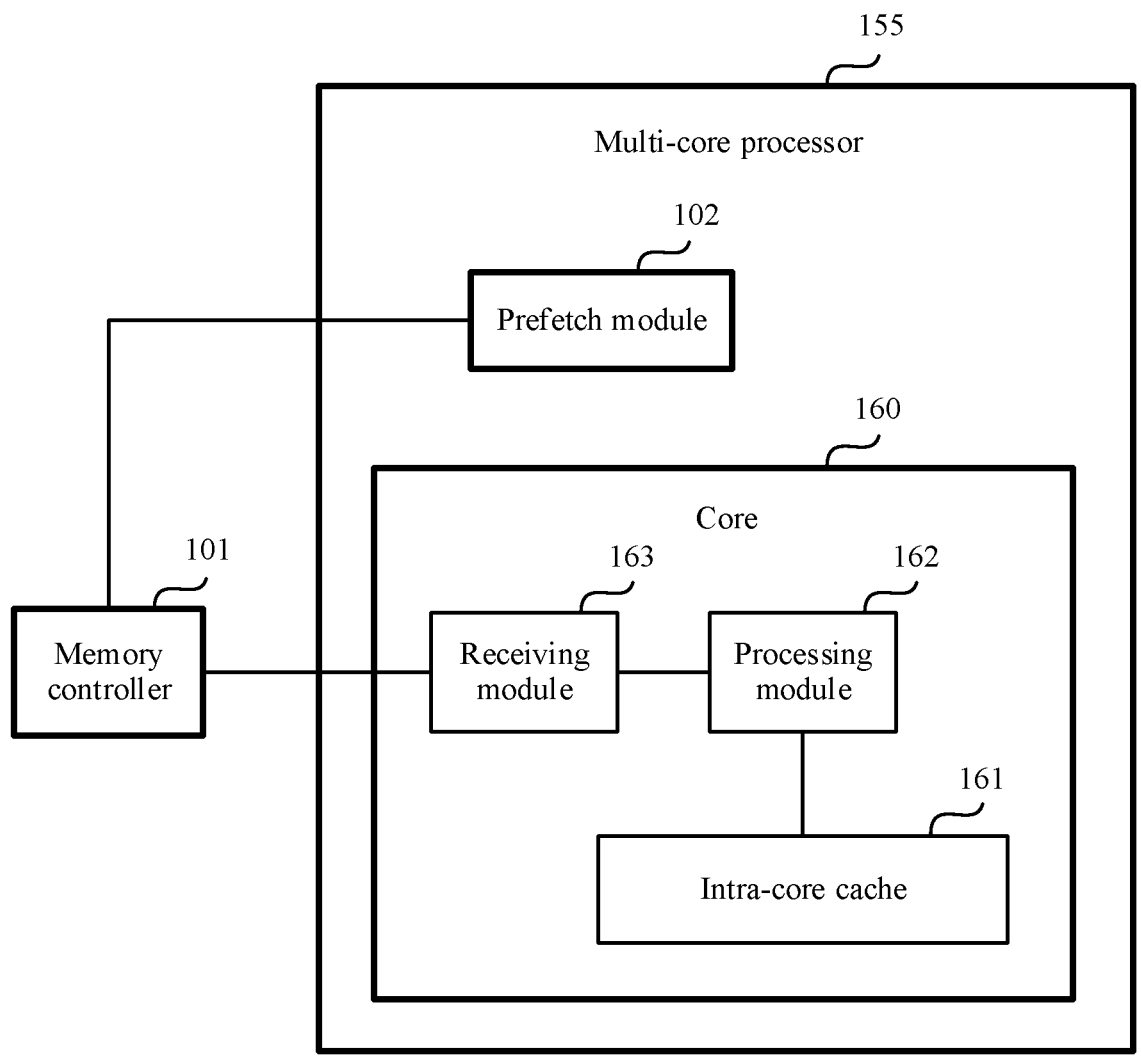
FIG. 1C is a schematic structural diagram of a multi-core processor according to an embodiment of this application.

Based on the same concept and the foregoing descriptions, an embodiment of this application provides a multi-core processor. FIG. 1C is an example schematic structural diagram of a multi-core processor according to an embodiment of this application. As shown in FIG. 1C, the multi-core processor includes a prefetch module 102 and a core 160. FIG. 1C shows only one core 160 as an example. However, the multi-core processor 155 may comprise one or more additional cores like the core 160. The core 160 includes a receiving module 163, a processing module 162, and an intra-core cache 161. The multi-core processor includes the prefetch module 102 and the plurality of cores. The prefetch module 102 sends a prefetch instruction to a memory controller 101, where the prefetch instruction includes an identifier of the core. The core 106 receives a feedback message from the memory controller 101, where the feedback message includes prefetched data. The core writes the prefetched data into the intra-core cache of the core.

To further improve overall control over data and more accurately learn a storage location of prefetched data, optionally, the prefetch instruction further includes a cache bank identifier, the feedback message further includes the cache bank identifier, and the processing module is configured to write the prefetched data into a cache bank indicated by the cache bank identifier.

Figure 1D:
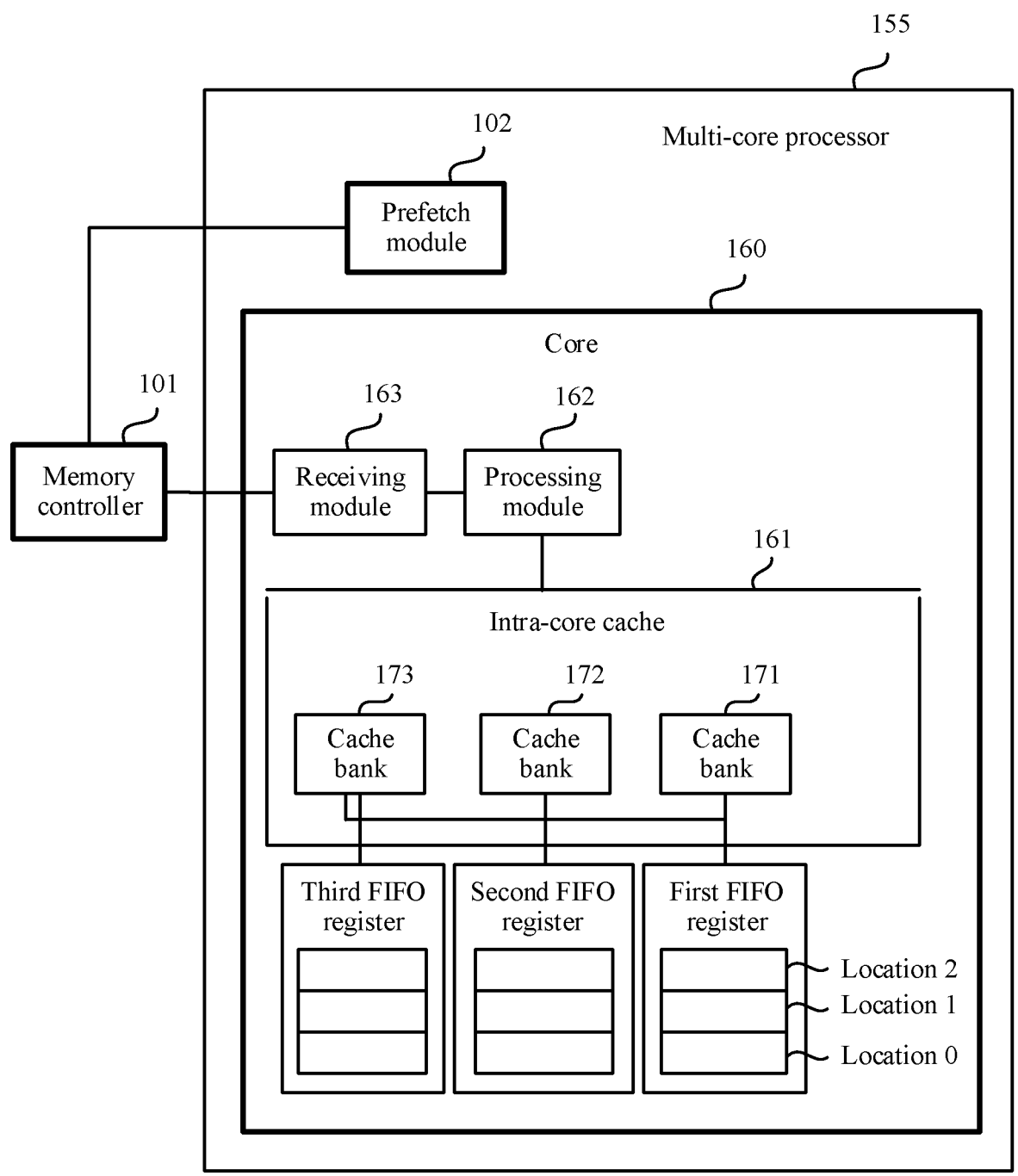
FIG. 1D is a schematic structural diagram of another multi-core processor according to an embodiment of this application.

Based on the same concept and the foregoing descriptions, FIG. 1D shows another example schematic structural diagram of core that is configured to access a memory of a multi-core processor 155 according to an embodiment of this application. As shown in FIG. 1D, an intra-core cache 161 includes at least one cache bank, for example, a cache bank 171, a cache bank 172, and a cache bank 173.

As shown in FIG. 1D, a core 160 further includes a FIFO register. Each cache bank is connected to at least one FIFO register, for example, a first FIFO register, a second FIFO register, and a third FIFO register shown in FIG. 1D. Each register includes at least one data bit, for example, a data bit at a location 0, a data bit at a location 1, and a data bit at a location 2 that are shown in FIG. 1D. Optionally, the multi-core system further includes P first in first out FIFO registers, and each of the P FIFO registers can store P data elements. A processing module is further configured to write P consecutive data elements respectively into the P FIFO registers, where the P FIFO registers are configured to enable a multi-core processor to obtain the P data elements by reading different data bits in the P FIFO registers in parallel and perform a computation operation based on the P data elements. In this way, when a plurality of data elements need to be read from an intra-core cache of a core, it is unnecessary to generate a plurality of read commands to respectively read the plurality of data elements. Instead, only one read instruction is generated, and the plurality of data elements are respectively read from the P FIFO registers according to the read instruction, thereby further reducing data processing time overheads.

Based on the same concept and the content described above, an embodiment of this application provides a method for accessing a system memory of a multi-core system. FIG. 2 shows an example schematic flowchart of a method for accessing a system memory of a multi-core system according to an embodiment of this application. As shown in FIG. 2, the method includes the following steps.

Step 211: A memory controller receives a first prefetch instruction sent by a prefetch module, where the first prefetch instruction includes an identifier of a first core.

Step 212: The memory controller obtains first data from a system memory according to the first prefetch instruction.

Step 213: The memory controller sends a first feedback message to the first core, where the first feedback message carries the first data. Optionally, steps 211 to 213 may be performed by the foregoing memory controller 101. Optionally, the method further includes the following step 214 and step 215.

Step 214: The first core receives the first feedback message from the memory controller, where the first feedback message includes the first data, the feedback message is sent by the memory controller after the memory controller receives the first prefetch instruction sent by the prefetch module and obtains the first data from the system memory according to the prefetch instruction, and the first prefetch instruction includes the identifier of the first core.

Step 215: The first core writes the first data into an intra-core cache of the first core. Optionally, step 214 and step 215 may be performed by any core in the multi-core system. The core may be the core 160 in FIG. 1B to FIG. 1D or may be any of the first core 106 to the fourth core 109 in FIG. 1 and FIG. 1A-1 and FIG. 1A-2. Optionally, for convenience of description, the core mentioned in step 211 to step 215 is referred to as the first core.

Optionally, the memory controller receives a second prefetch instruction sent by the prefetch module, where the second prefetch instruction includes an identifier of a second core, the memory controller obtains second data from the system memory according to the second prefetch instruction, and the memory controller sends a second feedback message to the second core, where the second feedback message carries the second data. The second core receives the second feedback message from the memory controller, where the second feedback message includes the second data, and the second feedback message is sent by the memory controller after the memory controller receives the second prefetch instruction sent by the prefetch module and obtains the second data from the system memory according to the prefetch instruction, where the second prefetch instruction includes the identifier of the second core, and the second core writes the second data into an intra-core cache of the second core. Optionally, step 214 and step 215 may be performed by any core in the multi-core system. The core may be the core 160 in FIG. 1B to FIG. 1D or may be any of the first core 106 to the fourth core 109 in FIG. 1 and FIG. 1A-1 and FIG. 1A-2. In other words, a process of prefetching to-be-prefetched data to an intra-core cache of a core in this embodiment of this application is similar to the foregoing step 211 to step 215.

Data prefetching can be completed by the prefetch module by sending a prefetch instruction, and the prefetch instruction includes an identifier of a core. Therefore, each segment of data is stored in an intra-core cache of which core can be learned using the prefetch instruction. This implements overall control over prefetched data, thereby preventing repeated data prefetching and reducing time overheads of an entire data processing process.

In an optional implementation solution, that the memory controller obtains prefetched data from the system memory according to a prefetch instruction includes the memory controller sets a memory channel to a busy state, and the memory controller obtains the prefetched data from the system memory according to the prefetch instruction, and after obtaining the prefetched data of a data length, sets the memory channel to an idle state. In this way, the first data can be prefetched to the intra-core cache in one time, and then the memory channel is handed over to and used by another core. This avoids a problem of frequently contending for the memory channel, thereby further saving a data prefetching time.

Optionally, there are a plurality of manners of setting a working status of the memory channel. For example, a burst mode may be used. When the working status of the memory channel is busy, a burst mode parameter may be set to 1. When the working status of the memory channel is idle, the burst mode parameter may be set to 0.

It can be learned from the foregoing optional solution that, in this embodiment of this application, the working status of the memory channel is first checked when a prefetch or prestore instruction is executed. The memory channel is, for example, a DDRx channel. The working status of the memory channel includes an idle state and a busy state. In an embodiment, a counter may be set during prefetching or prestorage of a segment of data. After one piece of data is prefetched/prestored, a value of the counter is incremented by 1, and after the segment of data is prefetched/prestored, the working status of the memory channel is set to idle. In this way, a core can be enabled to prefetch/prestore a whole segment of data. This avoids a case in that a data volume of one cache bank is prefetched/prestored each time and a channel is contended for again next time to continue prefetching/prestoring data. In this embodiment of this application, a quantity of times of contending for a channel by a core is reduced, thereby improving bandwidth utilization of a working channel, further reducing a memory access delay, and improving memory access performance.

Further, to prefetch/prestore data between an intra-core cache and a memory, a handshake needs to be established between a cache controller of a core and a memory controller of the memory. The data is prefetched/prestored after the handshake is successfully established, and the handshake is released after the data is prefetched/prestored. In this embodiment of this application, after each handshake, a whole segment of data is prefetched/prestored instead of one cache bank of data, thereby reducing a quantity of handshake times.

To further improve overall control over data and more accurately learn a storage location of prefetched data, optionally, a prefetch instruction further includes a cache bank identifier, a feedback message further includes the cache bank identifier, and the cache bank identifier is used to enable a core to write the prefetched data into a cache bank indicated by the cache bank identifier. Optionally, that a core writes the prefetched data into an intra-core cache of the core includes the core writes the prefetched data into the cache bank indicated by the cache bank identifier.

This embodiment of this application provides some optional implementation solutions to make some improvements to four system memory instructions a prefetch instruction, a prestore instruction, a read instruction, and a write instruction.

1. Prefetch Instruction

Optionally, the prefetch instruction further includes a data length of prefetched data. Therefore, the prefetched data of the data length can be prefetched to an intra-core cache in one time under instruction. This avoids a problem of a relatively long delay caused by contending for a memory channel for a plurality of times. The prefetch instruction further includes any one or more items of the following content: an identifier of the intra-core cache in which a segment of data that is prefetched according to the prefetch instruction is correspondingly stored, a start address, in the system memory, of the segment of data that is prefetched according to the prefetch instruction, and a data length of the segment of data that is prefetched according to the prefetch instruction. Table 1 is an example schematic table of a format of a prefetch instruction. As shown in Table 1, the prefetch instruction includes an instruction type, a core identifier, an identifier of an intra-core cache, a start address of data in the system memory, and a data length.

TABLE 1

Schematic table of the format of the prefetch instruction

| Instruction type | Core identifier | Identifier of the intra-core cache | Start address | Data length |
|---|---|---|---|---|
| Prefetch instruction | First core | First intra-core cache | 0x8000_F000 | 100 |

In Table 1, the instruction type is a flag bit for differentiating the instruction from another memory instruction. This embodiment of this application shows four memory instructions the prefetch instruction, the prestore instruction, the read instruction, and the write instruction. The instruction type in Table 1 may be represented using 2 bits.

The core identifier is an identifier of a target core that is in a multi-core system and that is corresponding to the instruction. It is assumed that the core identifier is corresponding to the first core. The identifier of the intra-core cache is an identifier number of the intra-core cache of the first core corresponding to the instruction. It is assumed that the identifier of the intra-core cache is corresponding to the first intra-core cache. In this embodiment of this application, each core may include a plurality of intra-core caches. However, during prefetching, in this embodiment of this application, M cores are used to prefetch M segments of data to intra-core caches of the M cores. In other words, one core prefetches only one segment of data to one intra-core cache of the core. If the core prefetches two segments of data to two intra-core caches of the core, the core is considered as two cores logically.

Optionally, the start address is a start address of a segment of data corresponding to the memory instruction in the system memory. It is assumed that the start address is 0x8000_F000. The data length is a quantity of elements in a prefetched segment of data that are expressed by word, for example, 100.

Based on the foregoing example, the prefetch instruction in Table 1 may instruct to prefetch consecutively, from the system memory of the multi-core system, 100 pieces of data with a system memory start address of 0x8000_F000, and to store the data consecutively in physical storage space in the first intra-core cache of the first core of the multi-core system. Optionally, a physical storage address of the data in the intra-core cache may be computed based on a system memory address of 00140. There are a plurality of specific algorithms. For example, a directed map method is used. In the method, the physical storage address is obtained by 0x8000_F000 mod a size of the intra-core cache.

For example, it is assumed that the size of the intra-core cache is 256 words. In the directed map method, each module with an index of idx in the 256-word intra-core cache may correspond to a word at a system memory address of 4*n*256+4*idx, where n is an integer, and 4 indicates that one word includes four bytes. Therefore, conversely, when an index in the intra-core cache in the directed map method is computed based on the system memory address of 0x8000_F000, a computing mode of (0x8000_F000/4) mod 256 is used. For example, when the system memory address is 0x8000_F000 (32 bits), an index value in a cache bank is (0x8000_F000>>2) & 0xff, where &0xff represents that mod 256 can be obtained using an AND operation (where 256 is the eighth power of 2). When a size of the cache bank is the Nth power of 2, physically, a mod operation may be directly selecting some bits at the system memory address. An address in the cache bank can be obtained using this method. Optionally, usually, in a memory channel, a plurality of pieces of data at consecutive addresses can be read or written in each period. If a bandwidth of the memory channel is four words, the prefetch instruction is completed using 100/4 data access clocks.

2. Read Instruction

Optionally, the read instruction further includes any one or more items of the following content: an identifier of an intra-core cache in which a segment of data that is read according to the read instruction is correspondingly stored, a start address, in the system memory, of the segment of data that is read according to the read instruction, and a data length of the segment of data that is read according to the read instruction. Table 2 is an example schematic table of a format of a read instruction. As shown in Table 2, the read instruction includes an instruction type, a core identifier, an identifier of an intra-core cache, a start address of data in the system memory, and a data length. Optionally, Table 2 further includes some other parameters. The start address, in the system memory, of the segment of data that is read according to the read instruction may be represented as an index of a location at which the data is stored in the intra-core cache. The address of the data in the system memory is in a one-to-one correspondence with the index in the intra-core cache. The data length represents a total length of data that needs to be read according to the read instruction. As shown in Table 2, read operations are consecutively performed 100 times starting from an address of 0x8000_F000.

TABLE 2

| | Schematic table of the format of the read instruction | | | | |
|---|---|---|---|---|---|
| Instruction type | Core identifier | Identifier of the intra-core cache | Start address | Data length | Other parameters |
| Read instruction | First core | First intra-core cache | 0x8000_F000 | 100 | |

The items in the read instruction are similar to the items in the prefetch instruction. Details are not described herein again. The read instruction means that the data is read from the first intra-core cache of the first core, the start address of the data in the system memory is 0x8000_F000, and the data length is 100. The other parameters in Table 2 are used to indicate some specific read modes or the like and are used as reserved interfaces to support various regular operations. For example, a conventional vector computation mode and a stencil computation mode are two typical regular operations. The intra-core cache is used differently in the two modes. For example, if a computation operation is stencil computation, a stencil may be set to "ON" in the other parameters, where "ON" means "enabled".

Optionally, in this embodiment of this application, stencil computation (stencil computation) is mostly used in a partial differential equation (partial differential equation). A representative feature of the stencil computation is that when an object element is being computed, elements surrounding a location at which the object element is located need to be accessed based on a specific geometric stencil. For example, in two-dimensional Jacobi computation, computation of an object element is completed based on five source data points surrounding a cross.

Optionally, conventional vector computation (vectorization) in this embodiment of this application is a computation mode in which an operation is simultaneously performed on a complex number of pieces of data. Vectorization is one of main operation modes of parallel data operations. Typically, a single-instruction multiple-data stream manner, which is generally referred to as a single-instruction multiple-data stream (SIMD) instruction, is used in vectorization.

The read instruction is used to, after data is prefetched from the system memory to the intra-core cache, read data consecutively from the intra-core cache to support intra-core computation. Similar to the prefetch instruction, each read instruction is responsible for reading data from one intra-core cache.

3. Write Instruction

Correspondingly, to clearly learn which data is written into or prestored in which region, optionally, after a computation operation is performed on M segments of data that are prefetched to an intra-core cache, the following operation is further included: a result of the computation operation is written into the intra-core cache based on a generated write instruction. The write instruction includes any one or more of the following: an identifier of a core into which the result of the computation operation is to be written, an identifier of the intra-core cache into which the result of the computation operation is to be written, a start address in the system memory at which the result of the computation operation is to be prestored, and a data length of the result of the computation operation. Table 3 is an example schematic table of a format of a write instruction. As shown in Table 3, the write instruction includes an instruction type, a core identifier, an identifier of an intra-core cache, a start address of data in the system memory, and a data length.

TABLE 3

Schematic table of the format of the write instruction

| Instruction type | Core identifier | Identifier of the intra-core cache | Start address | Data length |
|---|---|---|---|---|
| Write instruction | First core | First intra-core cache | 0x8000_F000 | 100 |

The write instruction is used to consecutively write a result obtained through computation into the intra-core cache and update a target address in the intra-core cache. The write instruction usually appears together with an output data stream in a loop body. For example, when a loop of FOR (i=0,i<N,i++) {C[i]=A[i]+B[i],} is being computed, an array C corresponds to a computation output of the loop body, and a write instruction is required to indicate a manner of updating data C in a cache bank. The write instruction instructs to write data into the first intra-core cache of the first core, where the data is written at a location that is in the intra-core cache and that is indicated by an index corresponding to the start address of 0x8000_F000 in the system memory, and the data length is 100. The address of the data in the system memory is in a one-to-one correspondence with the index in the intra-core cache.

4. Prestore Instruction

Optionally, after an $i^{th}$ first-dimension computation operation is performed on M segments of data that are prefetched to an intra-core cache and that need to be accessed in the $i^{th}$ first-dimension computation operation, the following operation is further included: a result that is of the $i^{th}$ first-dimension computation operation and that is written into the intra-core cache is written into the system memory according to a generated prestore instruction. The prestore instruction includes any one or more of the following: an identifier of a core in which the result of the $i^{th}$ first-dimension computation operation is stored, an identifier of the intra-core cache in which the result of the $i^{th}$ first-dimension computation operation is stored, a start address in the system memory at which the result of the $i^{th}$ first-dimension computation operation is to be prestored, and a data length of the result of the $i^{th}$ first-dimension computation operation. Table 4 is an example schematic table of a format of a prestore instruction. As shown in Table 4, the prestore instruction includes an instruction type, a core identifier, an identifier of an intra-core cache, a start address of data in the system memory, and a data length.

TABLE 4

Schematic table of the format of the prestore instruction

| Instruction type | Core identifier | Identifier of the intra-core cache | Start address | Data length |
|---|---|---|---|---|
| Prestore instruction | First core | First intra-core cache | 0x8000_F000 | 100 |

The prestore instruction represents that data corresponding to the prestore instruction is consecutively written from the intra-core cache to the system memory. For example, the prestore instruction means that to-be-written data in the first intra-core cache of the first core of the multi-core system is consecutively prestored to address space with a start address of 0x8000_F000 in the system memory, and the data length is 100. An algorithm of mapping between an index of the data in the intra-core cache and an address in the system memory is the same as that in the prefetch instruction. Details are not described herein again.

Based on the foregoing descriptions, an embodiment of this application provides a method for accessing a system memory of a multi-core system. If it is determined that N first-dimension computation operations, that is, N rounds of computation operations, need to be performed based on data stored in the system memory, where M segments of data in the data need to be read in each of the N first-dimension computation operations, and both N and M are integers greater than 1, two steps are performed in parallel—an $i^{th}$ first-dimension computation operation is performed based on M segments of data that are prefetched to an intra-core cache and that need to be accessed in the $i^{th}$ first-dimension computation operation, and R segments of data that need to be accessed in an $(i+1)^{th}$ first-dimension computation operation and that are not prefetched to an intra-core cache are prefetched, using R cores of remaining K−M cores except M cores in which the M segments of data that need to be accessed in the $i^{th}$ first-dimension computation operation are correspondingly stored, from the system memory to intra-core caches of the R cores according to R generated prefetch instructions, where R is an integer that is greater than or equal to 1 and that is less than or equal to a smaller value of M and K−M, and i is an integer that is greater than or equal to 1 and that is less than N. If i is equal to N, a last round of computation operation is performed, and computation is performed directly.

In this embodiment of this application, if it is determined that the N first-dimension computation operations need to be performed based on the data stored in the system memory, where the M segments of data in the data need to be read in each of the N first-dimension computation operations, and both N and M are integers greater than 1, when i is an integer that is greater than or equal to 1 and that is less than or equal to N−1, the R segments of data that need to be accessed in the $(i+1)^{th}$ first-dimension computation operation and that are not prefetched to an intra-core cache are prefetched from the system memory to the intra-core caches of the R cores according to the R generated prefetch instructions. In addition, each of the R prefetch instructions includes an identifier of a core. Therefore, each segment of data is stored in an intra-core cache of which core can be learned using the prefetch instruction, thereby implementing overall control over prefetched data. When an operation needs to be performed using a plurality of segments of data stored in intra-core caches of a plurality of cores, the data may be directly obtained from the intra-core caches of the plurality of cores without repeatedly prefetching data, thereby reducing data prefetching time overheads and improving operation efficiency of a processor.

Further, when i is an integer that is greater than or equal to 1 and that is less than or equal to N−1, for the $i^{th}$ first-dimension computation operation, if the M segments of data that need to be accessed in the $i^{th}$ first-dimension computation operation are prefetched, using M cores of K cores, from the system memory to intra-core caches of the M cores, where K is an integer that is greater than or equal to M+1, the following operations are performed in parallel: the $i^{th}$ first-dimension computation operation is performed based on the M segments of data that are prefetched to the intra-core caches and that need to be accessed in the $i^{th}$ first-dimension computation operation, and the R segments of data that need to be accessed in the $(i+1)^{th}$ first-dimension computation operation and that are not prefetched to an intra-core cache are prefetched, using the R cores of the remaining K−M cores except the M cores in which the M segments of data that need to be accessed in the $i^{th}$ first-dimension computation operation are correspondingly stored, from the system memory to the intra-core caches of the R cores according to the R generated prefetch instructions. It can be learned that prefetching and the first-dimension computation operation are performed in parallel, thereby improving computation efficiency of the processor.

Further, when i is an integer that is greater than or equal to 1 and that is less than or equal to N−1, for the $i^{th}$ first-dimension computation operation, the R segments of data that need to be accessed in the $(i+1)^{th}$ first-dimension computation operation and that are not prefetched to an intra-core cache are prefetched, using the R cores of the remaining K−M cores except the M cores in which the M segments of data that need to be accessed in the $i^{th}$ first-dimension computation operation are correspondingly stored, from the system memory to the intra-core caches of the R cores according to the R generated prefetch instructions. It can be learned that if M−R overlapping elements exist in the $i^{th}$ first-dimension computation operation and the $(i+1)^{th}$ first-dimension computation operation that are adjacent to each other, the M−R overlapping elements do not need to be prefetched again in the $(i+1)^{th}$ first-dimension computation operation, and only R elements that are newly added in the $(i+1)^{th}$ first-dimension computation operation compared with the $i^{th}$ first-dimension computation operation need to be prefetched. This further reduces data prefetching time overheads and improves operation efficiency of the processor.

In the multi-core system in this embodiment of this application, each segment of data is stored in an intra-core cache of one core. Therefore, a plurality of segments of data can be read concurrently from a plurality of intra-core caches. In an optional implementation solution, if i is an integer that is greater than 1 and is less than or equal to N, that an $i^{th}$ first-dimension computation operation is performed based on M segments of data that are prefetched to an intra-core cache and that need to be accessed in the $i^{th}$ first-dimension computation operation includes, M read instructions are generated, where each of the M read instructions includes an identifier of a core, and the identifier of the core in the read instruction is used to read, using the read instruction, a segment of data correspondingly stored in the core, if M−R overlapping segments of data exist between M segments of data that need to be accessed in an $(i−1)^{th}$ first-dimension computation operation and the M segments of data that need to be accessed in the $i^{th}$ first-dimension computation operation, the M−R segments of data are read, according to M−R corresponding read instructions that are among the M read instructions and that are used to read the M−R segments of data, from intra-core caches in which the M−R segments of data that need to be accessed in the $(i−1)^{th}$ first-dimension computation operation are correspondingly stored, and for R segments of data except the M−R segments of data among the M segments of data that need to be accessed in the $i^{th}$ first-dimension computation operation, the R segments of data are read, according to R corresponding read instructions that are among the M read instructions and that are used to read the R segments of data, from intra-core caches in which the R segments of data that need to be accessed in the $i^{th}$ first-dimension computation operation are correspondingly stored.

In other words, in this embodiment of this application, overall control is exerted on all segments of data used in each first-dimension computation operation. Therefore, when the $i^{th}$ first-dimension computation operation needs to be performed, if M−R overlapping segments of data exist in two adjacent first-dimension computation operations, in this embodiment of this application, it is unnecessary to repeatedly prefetch the M−R segments of data twice. In the $(i+1)^{th}$ first-dimension computation operation, the M−R overlapping segments of data prefetched in the $i^{th}$ first-dimension computation operation are used. This avoids a problem of repeatedly prefetching data in two adjacent first-dimension computation operations, thereby further reducing a volume of prefetched data, improving access efficiency, and improving system memory access performance.

Optionally, before data is prefetched according to the R generated prefetch instructions, the following operation is further included: M−R overlapping segments of data between M segments of data that need to be accessed in the $(i+1)^{th}$ first-dimension computation operation and the M segments of data that need to be accessed in the $i^{th}$ first-dimension computation operation are determined, and the R prefetch instructions are generated based on R segments of data except the M−R segments of data, overlapping with the M segments of data that need to be accessed in the $i^{th}$ first-dimension computation operation, of the M segments of data that need to be accessed in the $(i+1)^{th}$ first-dimension computation operation.

In other words, a prefetch instruction in this embodiment of this application includes an identifier of a core. Therefore, data can be prefetched to a specific core. Further, if M−R overlapping segments of data exist in two adjacent first-dimension computation operations, in the $(i+1)^{th}$ first-dimension computation operation, the M−R overlapping segments of data prefetched in the $i^{th}$ first-dimension computation operation are used, and only R segments of data that do not overlap with the $i^{th}$ first-dimension computation operation need to be prefetched. The R segments of data that do not overlap with the data may be determined first, and then the R prefetch instructions are generated and used to prefetch data, thereby reducing a quantity of prefetch instructions and reducing network overheads.

FIG. 2A, FIG. 2B, FIG. 2C, FIG. 2D, and FIG. 2E are example schematic diagrams of a solution for performing a first-dimension computation operation according to an embodiment of this application. With reference to FIG. 2A to FIG. 2E, the following describes an optional method for accessing a system memory of a multi-core system according to an embodiment of this application.

A possible program segment for performing a first-dimension computation operation is as follows:
 for (i=1;i<N;i=i+1)
  {for (j=1;j<L;j=j+1)

{B[i,j]=A[i−1,j]+A[i,j−1]+A[i,j]+A[i,j+1]+A[i+1,j];
}//j loop: an inner loop
}//i loop: an outer loop.

With reference to the foregoing program segment, as shown in FIG. 2A to FIG. 2D, N is 4. Four first-dimension computation operations are performed in total, and three segments of data need to be obtained in each first-dimension computation operation, that is, M is 3. In the figures, each segment of data represents one row of data.

Figure 2:
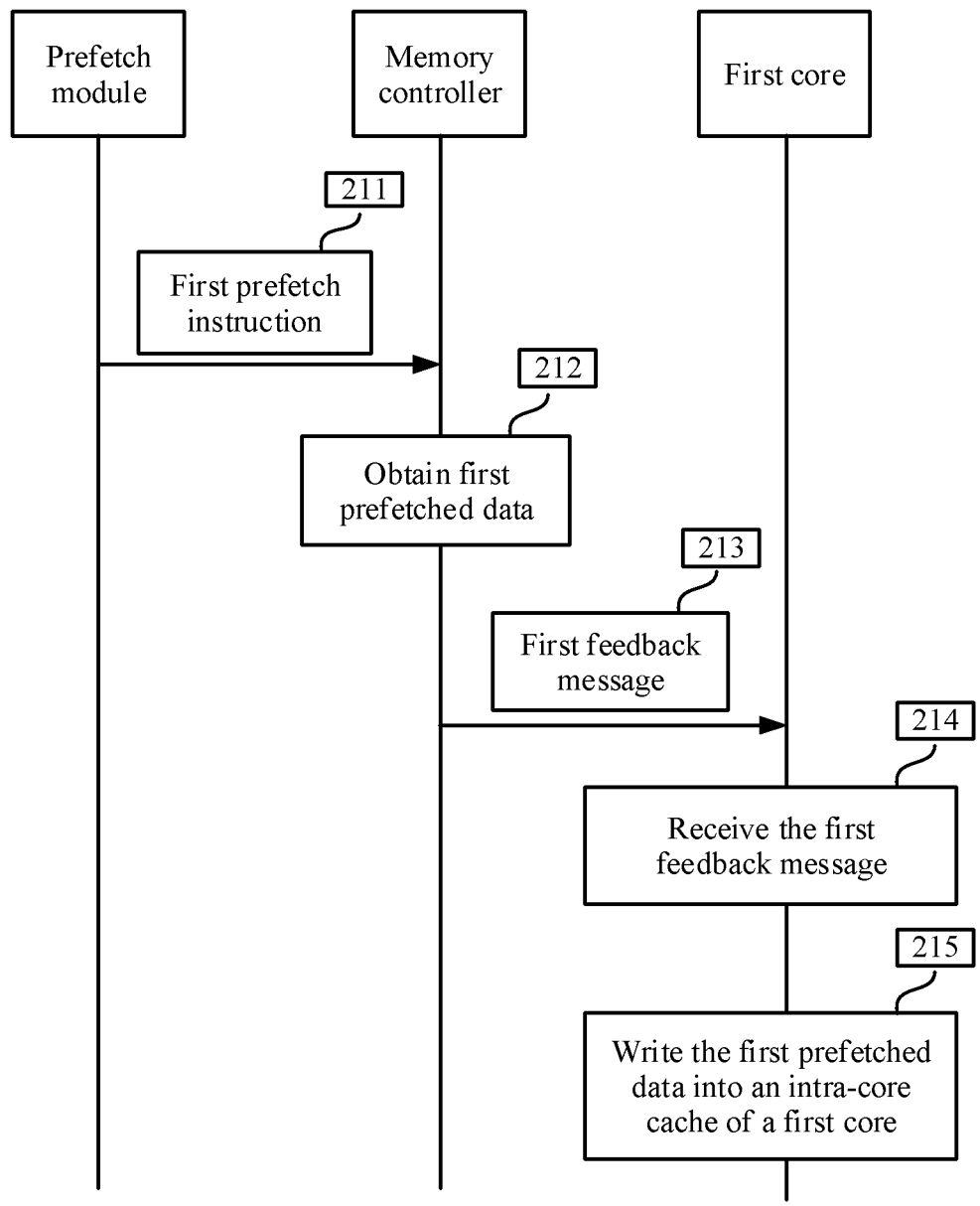
Figure 2A:
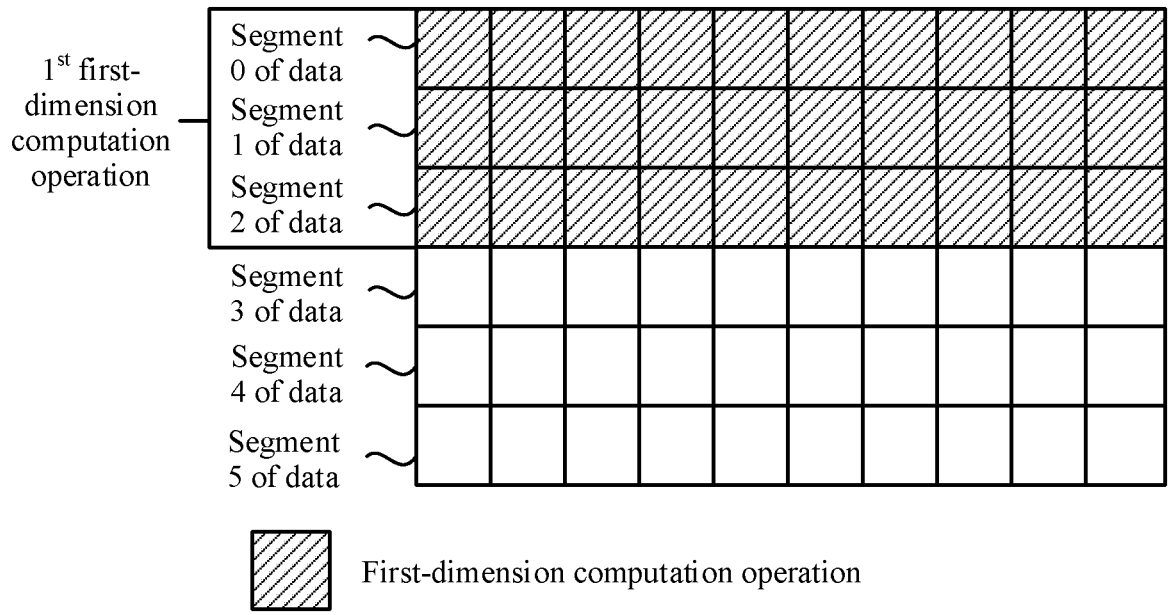
FIG. 2A is a schematic diagram of a solution for performing a first-dimension computation operation according to an embodiment of this application.
Figure 2B:
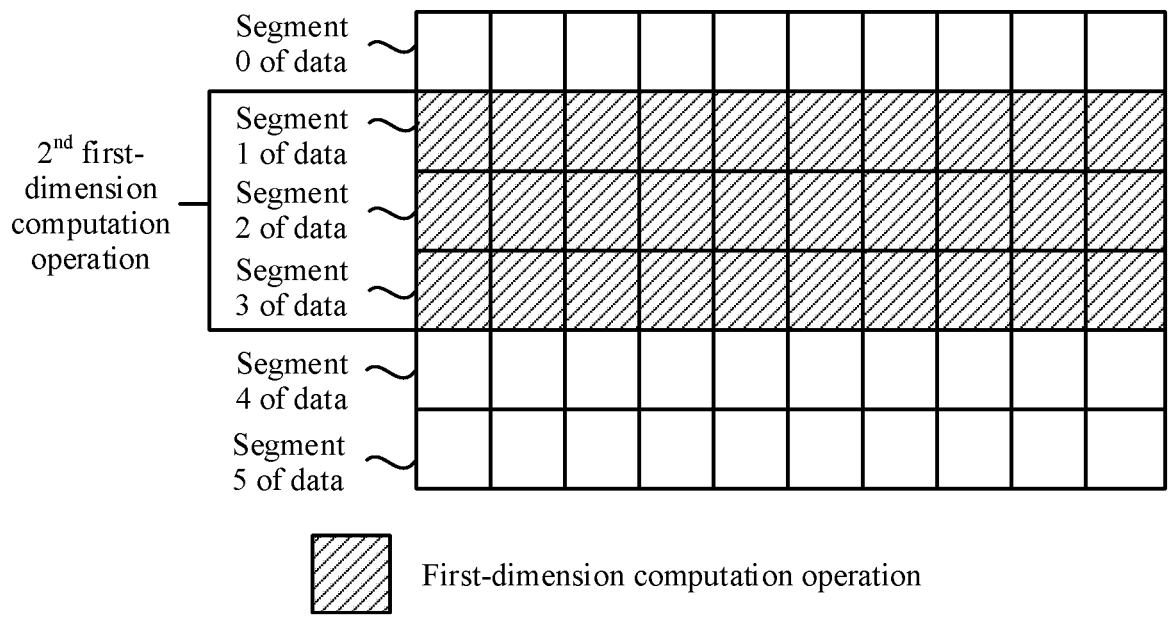
FIG. 2B is a schematic diagram of a solution for performing a first-dimension computation operation according to an embodiment of this application.
Figure 2C:
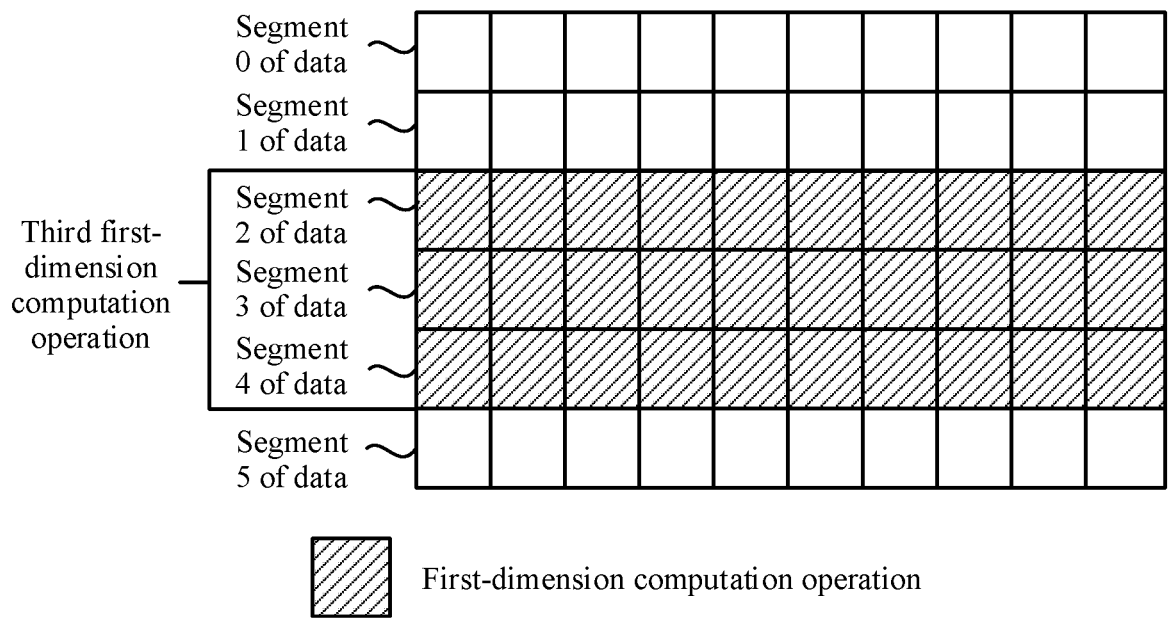
FIG. 2C is a schematic diagram of a solution for performing a first-dimension computation operation according to an embodiment of this application.
Figure 2D:
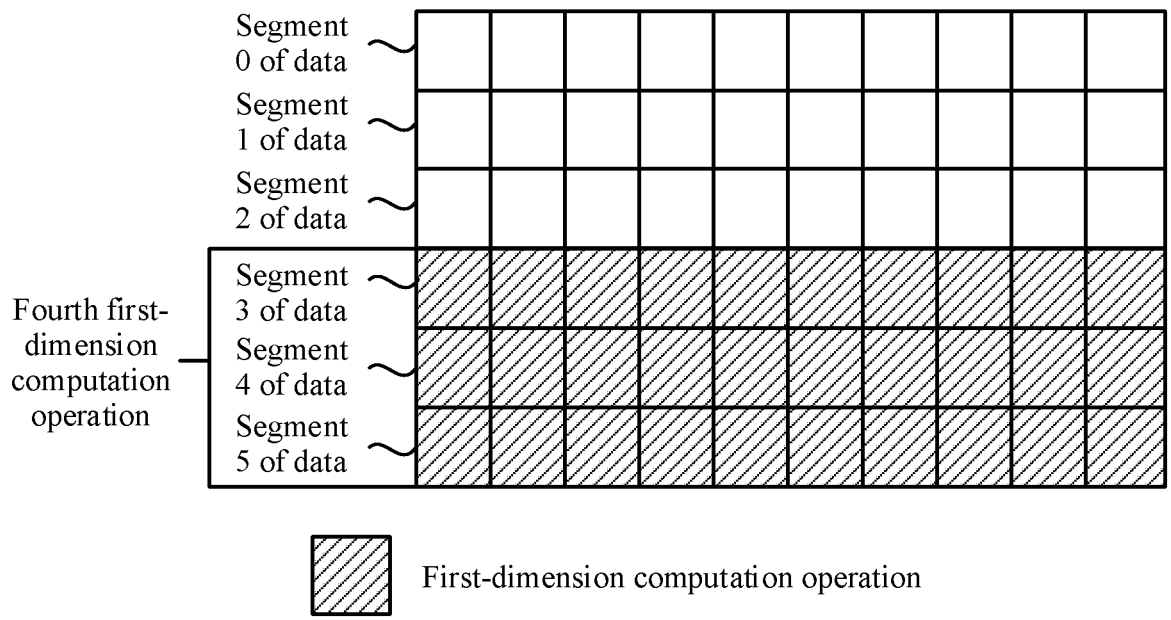
FIG. 2D is a schematic diagram of a solution for performing a first-dimension computation operation according to an embodiment of this application.

As shown in FIG. 2A, in a $1^{st}$ first-dimension computation operation, a segment 0 of data, a segment 1 of data, and a segment 2 of data are used. As shown in FIG. 2B, in a $2^{nd}$ first-dimension computation operation, the segment 1 of data, the segment 2 of data, and a segment 3 of data are used. As shown in FIG. 2C, in a $3^{rd}$ first-dimension computation operation, the segment 2 of data, the segment 3 of data, and a segment 4 of data are used. As shown in FIG. 2D, in a $4^{th}$ first-dimension computation operation, the segment 3 of data, the segment 4 of data, and a segment 5 of data are used.

In this example, three segments of data are required in each first-dimension computation operation. Therefore, the multi-core system applied in this example includes at least four cores. The first core to the fourth core shown in FIG. 1A-1 and FIG. 1A-2 are used for description.

In the $1^{st}$ first-dimension computation operation, the segment 0 of data is first prefetched to an intra-core cache of the first core using the first core, the segment 1 of data is prefetched to an intra-core cache of the second core using the second core, and the segment 2 of data is prefetched to an intra-core cache of the third core using the third core.

In the $1^{st}$ first-dimension computation operation, three prefetch instructions are generated, which are separately, a prefetch instruction used by the first core to prefetch the segment 0 of data to the intra-core cache of the first core prefetch|first core|first intra-core cache|start address A[0,0] |data length L+2, a prefetch instruction used by the second core to prefetch the segment 1 of data to the intra-core cache of the second core, prefetch|second core|first intra-core cache|start address A[1,0]|data length L+2, and a prefetch instruction used by the third core to prefetch the segment 2 of data to the intra-core cache of the third core, prefetch-|third core|first intra-core cache|start address A[2,0]|data length L+2.

The data length L+2 in each of the foregoing prefetch instructions means that a whole segment of data includes L+2 elements in total, and L second-dimension computation operations may be performed.

In the foregoing example, a segment of data is prefetched to an intra-core cache of a core. The intra-core cache is not necessarily a first intra-core cache. For example, alternatively, the segment 1 of data may be prefetched to a third intra-core cache of the second core using the second core.

The segment 1 of data and the segment 2 of data used in the $2^{nd}$ first-dimension computation operation both overlap with two segments of data used in the $1^{st}$ first-dimension computation operation. Therefore, only a new segment 3 of data needs to be prefetched in the $2^{nd}$ first-dimension computation operation.

After the segment 0 of data, the segment 1 of data, and the segment 2 of data are prefetched, the following operations are performed in parallel: the $1^{st}$ first-dimension computation operation is performed based on the three segments of data that are prefetched to the intra-core caches and that need to be accessed in the $1^{st}$ first-dimension computation operation, and the segment 3 of data is prefetched to an intra-core cache of the fourth core using the fourth core. In this way, computation and prefetching are synchronously performed, thereby reducing delay overheads. In addition, the segment 0 of data and the segment 1 of data do not need to be prefetched repeatedly, thereby reducing a volume of prefetched data and further improving system memory access performance.

As shown in FIG. 2B, after the segment 3 of data is prefetched, the following operations are performed in parallel: the segment 1 of data prefetched to the second core, the segment 2 of data prefetched to the third core, and the segment 3 of data prefetched to the fourth core are read, to perform the $2^{nd}$ first-dimension computation operation, and the segment 4 of data is prefetched using the first core.

As shown in FIG. 2C, after the segment 4 of data is prefetched, the following operations are performed in parallel: the segment 2 of data prefetched to the third core, the segment 3 of data prefetched to the fourth core, and the segment 4 of data prefetched to the first core are read, to perform the $3^{rd}$ first-dimension computation operation, and the segment 5 of data is prefetched using the second core.

As shown in FIG. 2D, because four first-dimension computation operations are performed in total, after the segment 5 of data is prefetched, the following operation is performed: the segment 3 of data prefetched to the fourth core, the segment 4 of data prefetched to the first core, and the segment 5 of data prefetched to the second core are read, to perform the $4^{th}$ first-dimension computation operation.

It can be learned from the foregoing example that in each first-dimension computation operation, one segment of data that needs to be accessed in an $(i+1)^{th}$ first-dimension computation operation and that is not prefetched to an intra-core cache is prefetched to an intra-core cache of one core in the system memory according to one generated prefetch instruction. In addition, each prefetch instruction of the prefetch instructions includes an identifier of a core. Therefore, each segment of data is stored in an intra-core cache of which core can be learned using the prefetch instruction, thereby implementing overall control over prefetched data. When an operation needs to be performed using a plurality of segments of data that are stored in intra-core caches of a plurality of cores, the data may be directly obtained from the intra-core caches of the plurality of cores.

Further, if i is an integer that is greater than or equal to 1 and that is less than or equal to 3, prefetching and computation operations are performed in parallel for an $i^{th}$ first-dimension computation operation, thereby improving computation efficiency of a processor.

Further, when i is greater than or equal to 1 and is less than or equal to 3, for the $i^{th}$ first-dimension computation operation, if two overlapping segments of data exist in the $i^{th}$ first-dimension computation operation and the $(i+1)^{th}$ first-dimension computation operation that are adjacent to each other, the two overlapping segments of data do not need to be prefetched again in the $(i+1)^{th}$ first-dimension computation operation, and only one segment of data that is newly added in the $(i+1)^{th}$ first-dimension computation operation compared with the $i^{th}$ first-dimension computation operation needs to be prefetched. This further reduces data prefetching time overheads and improves operation efficiency of the processor.

Optionally, in the foregoing example, a core that performs first-dimension computation after three segments of data are read may be any core in the multi-core system.

When prefetched data is stored in an intra-core cache, and a plurality of data elements need to be read from the intra-core cache, in another optional implementation provided in this embodiment of this application, the multi-core system further includes P first in first out FIFO registers, where each of the P FIFO registers can store P data elements. After a core writes prefetched data into an intra-core cache of a core, the following operation is further included the core writes P consecutive data elements respectively into the P FIFO registers, where the P FIFO registers are configured to enable a multi-core processor to obtain the P data elements by reading different data bits in the P FIFO registers in parallel and perform a computation operation based on the P data elements.

The following provides description using an example in which L second-dimension computation operations need to be performed based on data prefetched to an intra-core cache, where L is an integer greater than or equal to 1. For a $j^{th}$ second-dimension computation operation, where j is an integer that is greater than or equal to 1 and that is less than or equal to L, at least one data element in the prefetched data that needs to be accessed in the $j^{th}$ second-dimension computation operation is read from the prefetched data that is prefetched to the intra-core cache, to perform the $j^{th}$ second-dimension computation operation. Further, in this embodiment of this application, optionally, L second-dimension computation operations may be performed in each first-dimension computation operation. In this way, relatively complex multiple arithmetic can be implemented. In addition, a relatively high running rate and a relatively low system memory access delay can still be maintained in the relatively complex arithmetic.

For a second-dimension computation operation, to further reduce a system memory access delay, when data is read from an intra-core cache, this embodiment of this application further provides several optional implementations to increase a data read rate. Optionally, for the $j^{th}$ second-dimension computation operation, where j is an integer that is greater than or equal to 1 and that is less than or equal to L, if P data elements in a segment of data need to be read in the $j^{th}$ second-dimension computation operation, where P is an integer greater than 1, the P data elements in the segment of data are successively input into Q FIFO registers that are connected to a cache bank in which the segment of data is correspondingly stored, where Q is greater than or equal to P, and the P data elements in the segment of data that needs to be accessed in the $j^{th}$ second-dimension computation operation are respectively read from the Q FIFO registers, where one data element is correspondingly read from one FIFO register.

Figure 2E:
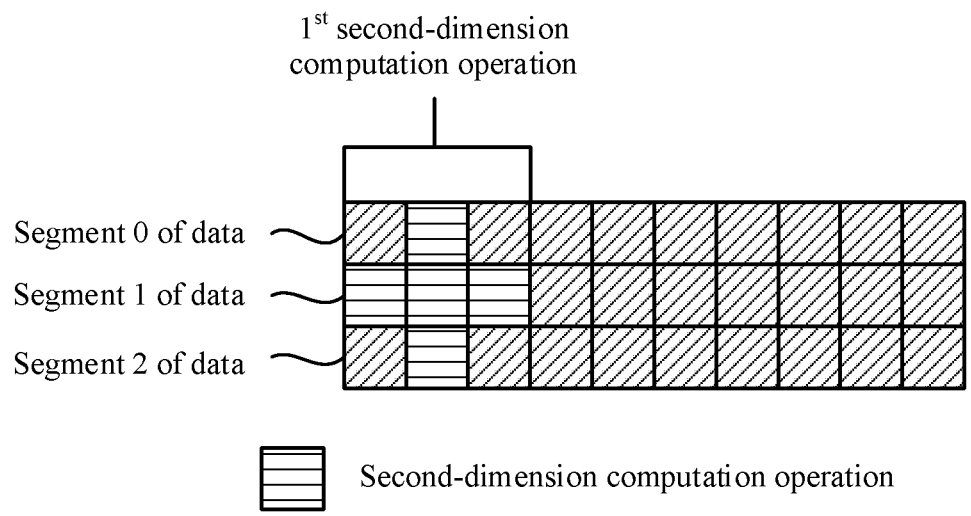
FIG. 2E is a schematic diagram of a second-dimension computation operation according to an embodiment of this application.
Figure 2F:
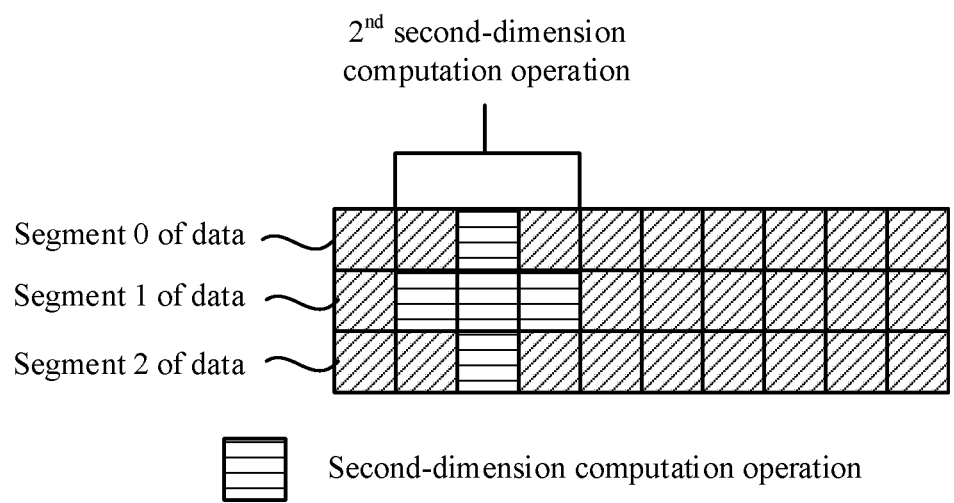
FIG. 2F is a schematic diagram of a second-dimension computation operation according to an embodiment of this application.
Figure 2G:
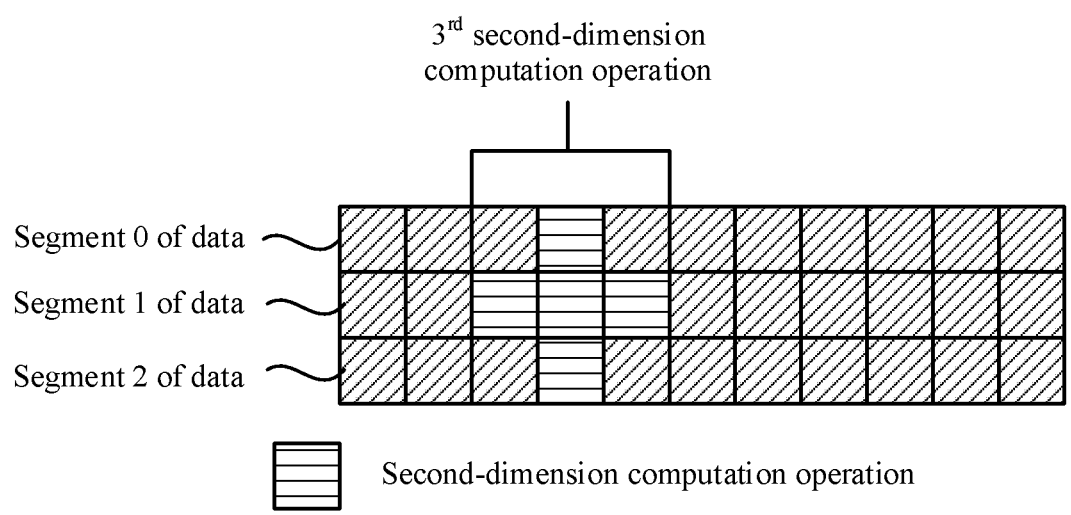
FIG. 2G is a schematic diagram of a second-dimension computation operation according to an embodiment of this application.
Figure 2H:
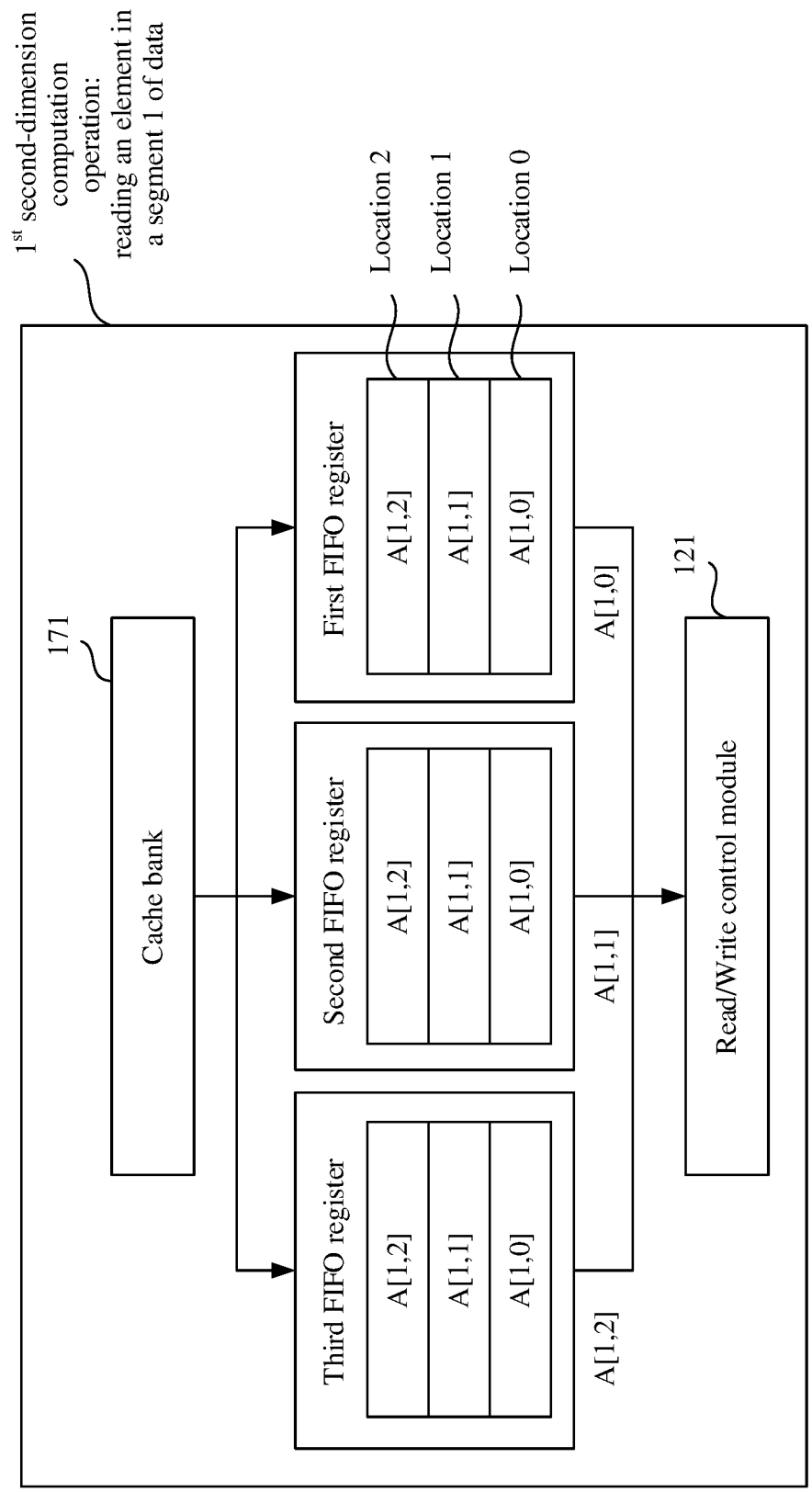
FIG. 2H is a schematic diagram in which an intra-core cache is connected to Q FIFO registers according to an embodiment of this application.
Figure 2I:
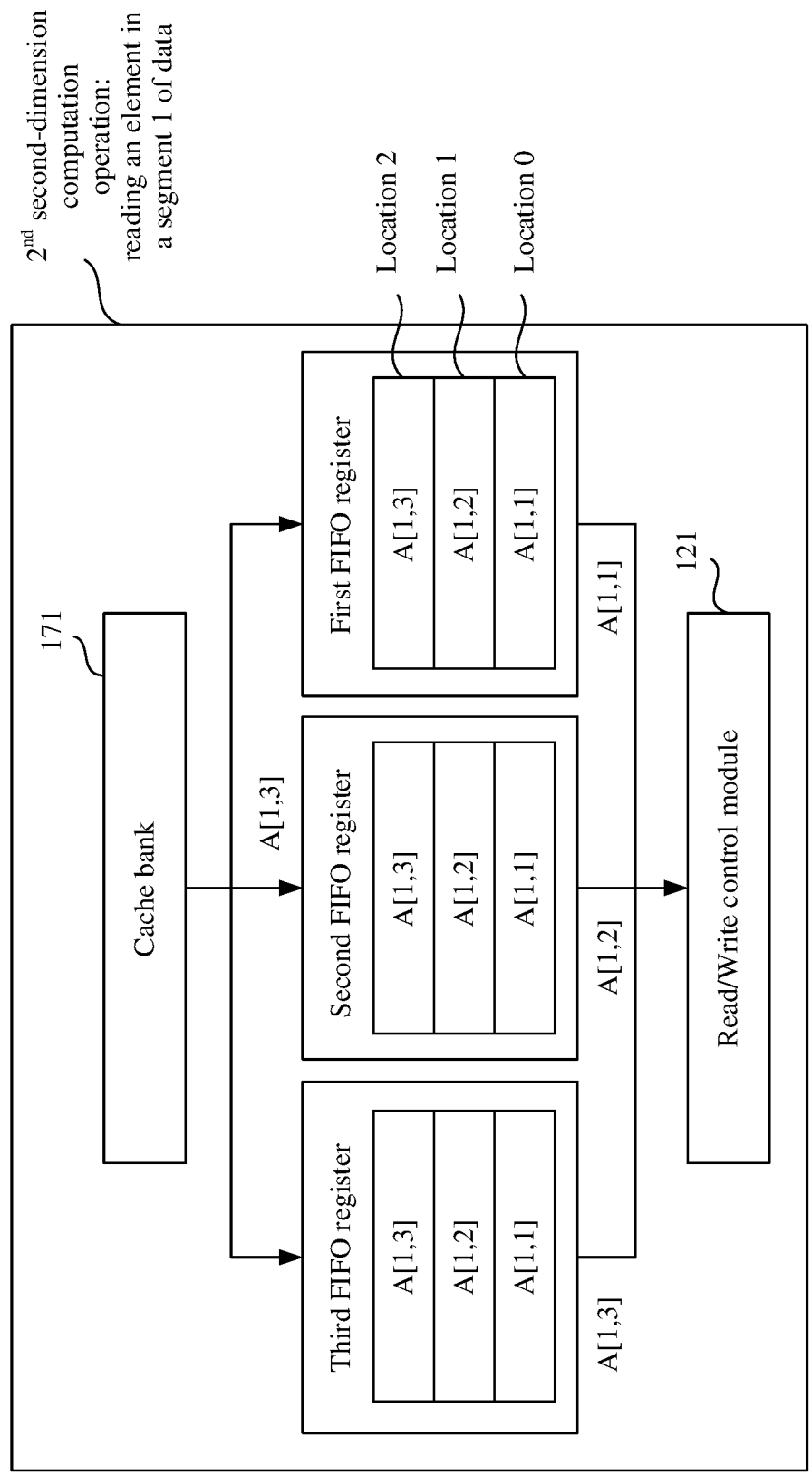
FIG. 2I is a schematic diagram in which an intra-core cache is connected to Q FIFO registers according to an embodiment of this application.

FIG. 2H and FIG. 2I are example schematic diagrams in which a cache bank is connected to Q FIFO registers according to an embodiment of this application. As shown in FIG. 2H and FIG. 2I, using the second core in FIG. 1 for illustration, the cache bank is connected to the Q FIFO registers, where Q is greater than or equal to P, and P indicates that the P data elements in the segment of data need to be read in the $j^{th}$ second-dimension computation operation. If three data elements in a segment 1 of data need to be read in each second-dimension computation operation, a value of Q needs to be greater than or equal to 3. For example, three FIFO registers are drawn in FIG. 2H and FIG. 2I for illustration. As shown in the figures, the three data elements are successively input into the three FIFO registers, and the three data elements are respectively read from the three FIFO registers, thereby improving data read efficiency and further reducing a system memory access delay.

Optionally, the Q FIFO registers are first in first out (FIFO) registers. A maximum quantity of data elements that can be stored in each of the Q FIFO registers is greater than or equal to P. With reference to the foregoing example, as shown in FIG. 2H and FIG. 2I, the maximum quantity of data elements that can be stored in each FIFO register is greater than or equal to 3. Therefore, when the FIFO register is a first in first out FIFO register, each register can store three latest data elements. This can prevent a data element that is no longer used from occupying storage space of a register, and can also enable a data element stored in the register to meet a requirement of a second-dimension computation operation.

Optionally, if j is an integer that is greater than 1 and that is less than or equal to L, that the P data elements in the segment of data are successively input into Q FIFO registers that are connected to a cache bank in which the segment of data is correspondingly stored, and the P data elements in the segment of data that needs to be accessed in the $j^{th}$ second-dimension computation operation are respectively read from the Q FIFO registers includes, for the segment of data, S overlapping data elements between the P data elements that need to be read in the $j^{th}$ second-dimension computation operation and P data elements that need to be read in a $(j-1)^{th}$ second-dimension computation operation are determined, where S is an integer that is greater than or equal to 1 and that is less than or equal to P, P–S data elements except the S data elements, overlapping with the P data elements that need to be read in the $(j-1)^{th}$ second-dimension computation operation, of the P data elements that need to be read in the $j^{th}$ second-dimension computation operation are successively input to the Q FIFO registers that are connected to the cache bank in which the segment of data is correspondingly stored, and the S data elements that are input to the Q FIFO registers before the $(j-1)^{th}$ second-dimension computation operation is performed and that overlap with the P data elements that need to be read in the $j^{th}$ second-dimension computation operation and the P–S data elements except the S data elements, overlapping with the P data elements that need to be read in the $(j-1)^{th}$ second-dimension computation operation, of the P data elements that need to be read in the $j^{th}$ second-dimension computation operation are read from the Q FIFO registers. In this way, in each second-dimension computation operation, only a data element that is newly added in a current second-dimension computation operation compared with a previous second-dimension computation operation needs to be input to a FIFO register, thereby further reducing delay overheads.

FIG. 2E, FIG. 2F, and FIG. 2G are example schematic diagrams of a $1^{st}$ second-dimension computation operation, a $2^{nd}$ second-dimension computation operation, and a $3^{rd}$ second-dimension computation operation. When B[i,j] is being computed, A[i−1,j] in a segment 0 of data, A[i,j−1], A[i,j], and A[i,j+1] in a segment 1 of data, and A[i+1,j] in a segment 2 of data are separately read. As shown in FIG. 2E, in the $1^{st}$ second-dimension computation operation, a second data element in the segment 0 of data, a first data element, a second data element, and a third data element in the segment 1 of data, and a second data element in the segment 2 of data are separately read. With reference to the foregoing program segment, when B[1,1] is being computed, A[0,1] in the segment 0 of data, A[1,0], A[1,1], and A[1,2] in the segment 1 of data, and A[2,1] in the segment 2 of data are separately read.

The following specifically describes several possible specific formats of read instructions with reference to the foregoing example. In the $1^{st}$ second-dimension computation operation, the specific instruction formats are as follows.

For the segment 0 of data, only one data element is read, that is, the second data element A[0,1] in the segment 0 of data needs to be read. A read instruction is, read|first core|first cache bank|start address A[0,1]|data length L|other options, stencil=OFF (where "OFF" means "disenabled"). When the stencil is OFF, the read instruction instructs to directly read data L consecutive times starting from A[0,1] from the first cache bank of the first core, to perform L second-dimension computation operations. One piece of data is read each time, to perform a second-dimension computation operation. In the read instruction, the start address A[0,1] represents a storage address of the data A[0,1] in a system memory or an index of the data A[0,1] in the first cache bank of the first core. The storage address of A[0,1] in the system memory is in a one-to-one correspondence with the index of A[0,1] in the first cache bank of the first core.

For the segment 2 of data, only one data element is read, that is, the second data element A[2,1] in the segment 2 of data needs to be read. A read instruction is, read|first core|first cache bank|start address A[2,1]|data length L|other options, stencil=OFF (where "OFF" means "disenabled"). When the stencil is OFF, the read instruction instructs to directly read data L consecutive times starting from A[2,1] from the first cache bank of the first core, to perform L second-dimension computation operations. One piece of data is read each time, to perform one second-dimension computation operation. In the read instruction, the start address A[2,1] represents a storage address of the data A[2,1] in the system memory or an index of the data A[2,1] in the first cache bank of the first core. The storage address of A[2,1] in the system memory is in a one-to-one correspondence with the index of A[2,1] in the first cache bank of the first core.

For read of the segment 1 of data, refer to FIG. 2H. A[1,0], A[1,1], and A[1,2] are successively input into three FIFO registers, a first FIFO register, a second FIFO register, and a third FIFO register. As shown in FIG. 2H and FIG. 2I, each FIFO register includes three registers. A register at a bottom part of each FIFO register is referred to as a register at a register location 0, a register at a middle part of each FIFO register is referred to as a register at a register location 1, and a register at a top part of each FIFO register is referred to as a register at a register location 2. In this embodiment of this application, optionally, a FIFO register is a first in first out FIFO register. New data is input to a register at a location 2 of the FIFO register, and data in a register at a bottom location 0 is pushed out. As shown in FIG. 2G, data currently stored at a location 2 to a location 0 of the first FIFO register is A[1,2], A[1,1], and A[1,0] successively. As shown in FIG. 2I, when new data A[1,3] is input, data stored at the location 2 to the location 0 of the first FIFO register is A[1,3], A[1,2], and A[1,1] successively. Optionally, if each core includes a plurality of cache banks, each of the plurality of cache banks is connected to each of all FIFO registers in the core.

For the segment 1 of data, A[1,0], A[1,1], and A[1,2] need to be respectively read from the three FIFO registers.

There are three read instructions for reading the segment 1 of data in the $1^{st}$ second-dimension computation operation. A first read instruction for reading the segment 1 of data is, read|second core|first cache bank|start address C[1,0]|data length L|other options, stencil=ON (where "ON" means "enabled"). When the stencil is ON, the start address C[1,0] means that a value in a register at the location 0 of the first FIFO register is read, and the data length L means that data is read L consecutive times, to perform L second-dimension computation operations. As shown in FIG. 2G, the value in the register at the location 0 of the first FIFO register is A[1,0], and A[1,0] can be read using the read instruction. As shown in FIG. 2I, when the $2^{nd}$ second-dimension computation operation is performed, a value A[1,1] is read from the register at the location 0 of the first FIFO register using the read instruction.

A second read instruction for reading the segment 1 of data is, read|second core|first cache bank|start address C[2,1]|data length L|other options, stencil=ON (where "ON" means "enabled"). When the stencil is ON, the start address C[2,1] means that a value in a register at a location 1 of the second FIFO register is read, and the data length L means that data is read L consecutive times, to perform L second-dimension computation operations. As shown in FIG. 2G, the value in the register at the location 1 of the second FIFO register is A[1,1], and A[1,1] can be read using the read instruction. As shown in FIG. 2I, when the $2^{nd}$ second-dimension computation operation is performed, a value A[1,2] is read from the register at the location 1 of the second FIFO register using the read instruction.

A third read instruction for reading the segment 1 of data is, read|second core|first cache bank|start address C[3,2]|data length L|other options, stencil=ON (where "ON" means "enabled"). When the stencil is ON, the start address C[3,2] means that a value in a register at a location 2 of the third FIFO register is read, and the data length L means that data is read L consecutive times, to perform L second-dimension computation operations. As shown in FIG. 2G, the value in the register at the location 2 of the third FIFO register is A[1,2], and A[1,2] can be read using the read instruction. As shown in FIG. 2I, when the $2^{nd}$ second-dimension computation operation is performed, a value A[1,3] is read from the register at the location 2 of the third FIFO register using the read instruction.

In this embodiment of this application, when the $2^{nd}$ second-dimension computation operation is being performed, no new read instruction needs to be generated again, and the read instructions in the $1^{st}$ second-dimension computation operation are reused. The read instructions in the $1^{st}$ second-dimension computation operation are executed L times in sequence, to complete the L second-dimension computation operations. This reduces a quantity of read instructions.

In addition, it can be learned from FIG. 2H and FIG. 2I that the $1^{st}$ segment of data in the $1^{st}$ second-dimension computation operation and the $1^{st}$ segment of data in the $2^{nd}$ second-dimension computation operation include overlapping data elements, A[1,1] and A[1,2]. Therefore, as shown in FIG. 2I, when the $2^{nd}$ second-dimension computation operation is being performed, only the data element A[1,3] needs to be input from a cache bank 171 to the three FIFO registers successively, without fetching A[1,1] and A[1,2] into the FIFO registers again. This implements data reuse, thereby further reducing a data read delay.

Based on the same concept, an embodiment of this application provides a memory controller 300, configured to perform any solution in the foregoing method.

Figure 3:
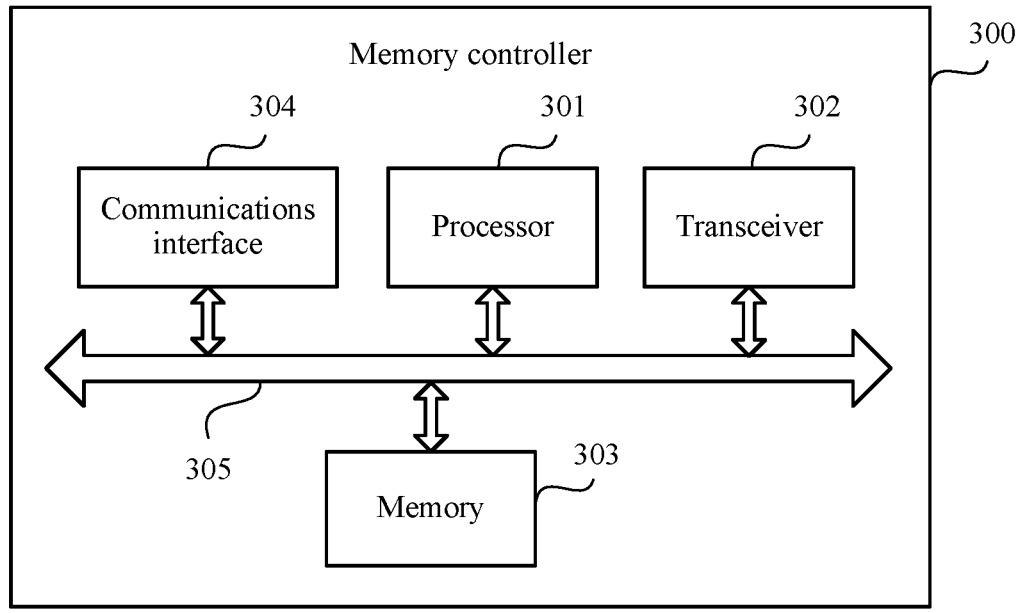
FIG. 3 is a schematic structural diagram of another memory controller according to an embodiment of this application.

As shown in FIG. 3, the memory controller 300 includes a processor 301, a transceiver 302, a memory 303, and a communications interface 304. The processor 301, the transceiver 302, the memory 303, and the communications interface 304 are interconnected through a bus 305. Optionally, the memory 303 in the memory controller 300 provided in this embodiment of this application may include the system memory in FIG. 1. Optionally, the communications interface 304 in the memory controller 300 provided in this embodiment of this application may include interfaces between the apparatuses in FIG. 1, for example, the first interface 104 and the second interface 105.

The bus 305 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not mean that there is only one bus or only one type of bus.

The memory 303 may include a volatile memory, for example, a random access memory (RAM), or the memory may include a non-volatile memory, for example, a flash memory, a hard disk drive (HDD), or a solid state drive (SSD), or the memory 303 may include a combination of the foregoing types of memories.

The communications interface 304 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local area network (WLAN) interface.

The processor 301 may be a central processing unit CPU, an NP, or a combination of a CPU and an NP. The processor 301 may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), a generic array logic (GAL), or any combination thereof.

Optionally, the memory 303 may be further configured to store a program instruction. The processor 301 invokes the program instruction stored in the memory 303 to perform one or more steps in the embodiment shown in the foregoing solution, or in an optional implementation, enable the memory controller 300 in the multi-core system to implement a function of the memory controller in the foregoing method.

The transceiver 302 is configured to receive a prefetch instruction sent by a prefetch module, where the prefetch instruction includes an identifier of a core, and send a feedback message to the core, where the feedback message carries prefetched data. The processor 301 is configured to obtain the prefetched data from the system memory according to the prefetch instruction.

Optionally, the prefetch instruction further includes a data length of the prefetched data.

Optionally, the processor 301 is configured to set a memory channel to a busy state, obtain the prefetched data from the system memory according to the prefetch instruction, and after obtaining the prefetched data of the data length, set the memory channel to an idle state.

Optionally, the prefetch instruction further includes a cache bank identifier, the feedback message further includes the cache bank identifier, and the cache bank identifier is used to enable the core to write the prefetched data into a cache bank indicated by the cache bank identifier.

Based on the same concept, an embodiment of this application provides a multi-core processor, configured to perform any solution in the foregoing method.

Figure 4:
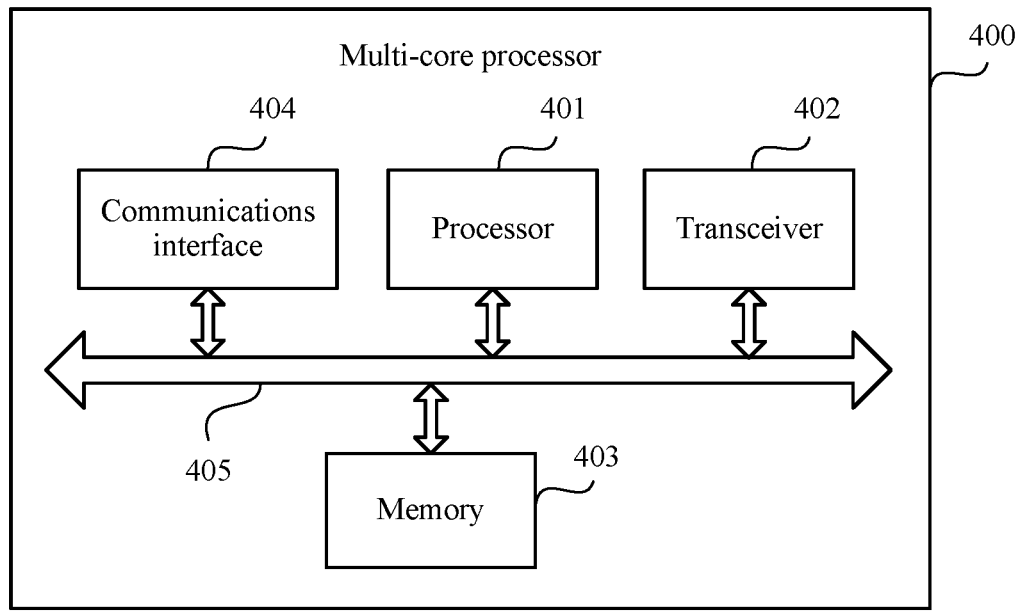
FIG. 4 is a schematic structural diagram of another multi-core processor according to an embodiment of this application.

As shown in FIG. 4, a multi-core processor 400 includes a prefetch module and a plurality of cores. Each core includes a processor 401, a transceiver 402, a memory 403, and a communications interface 404. The prefetch module is a module in a processor of one of the plurality of cores. The processor 401, the transceiver 402, the memory 403, and the communications interface 404 are interconnected through a bus 405. Optionally, the memory 403 in the multi-core processor 400 provided in this embodiment of this application may include the intra-core cache in FIG. 1. Optionally, the communications interface 404 in the multi-core processor 400 provided in this embodiment of this application may include interfaces between the apparatuses in FIG. 1, for example, the first interface 104 and the second interface 105.

The bus 405 may be a PCI bus, an EISA bus, or the like. The bus may be classified into an address bus, a data bus, a control bus, and the like. For ease of representation, only one thick line is used to represent the bus in FIG. 4, but this does not mean that there is only one bus or only one type of bus.

The memory 403 may include a volatile memory, for example, a RAM, or the memory may include a non-volatile memory, for example, a flash memory), a HDD, or an SSD, or the memory 403 may include a combination of the foregoing types of memories.

The communications interface 404 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 401 may be a CPU, an NP, or a combination of a CPU and an NP. The processor 401 may further include a hardware chip. The hardware chip may be an ASIC, a PLD, or a combination thereof. The PLD may be a CPLD, an FPGA, a GAL, or any combination thereof.

Optionally, the memory 403 may be further configured to store a program instruction. The processor 401 invokes the program instruction stored in the memory 403 to perform one or more steps in the embodiment shown in the foregoing solution, or in an optional implementation, enable the multi-core processor 400 to implement a function of the core in the foregoing method.

The processor 401 writes prefetched data into an intra-core cache of the core. The transceiver 402 is configured to send a prefetch instruction to a memory controller, where the prefetch instruction includes an identifier of the core, and receive a feedback message from the memory controller, where the feedback message includes the prefetched data. Sending a prefetch instruction to a memory controller may be performed by a processor of a core of the multi-core processor.

Optionally, the prefetch instruction further includes a data length of the prefetched data.

Optionally, the prefetch instruction further includes a cache bank identifier, and the feedback message further includes the cache bank identifier. The processor 401 is configured to write the prefetched data into a cache bank indicated by the cache bank identifier.

Optionally, a multi-core processor further includes P first in first out FIFO registers, and each of the P FIFO registers can store P data elements. The processor 401 is further configured to write P consecutive data elements respectively into the P FIFO registers, where the P FIFO registers are configured to enable the multi-core processor to obtain the P data elements by reading different data bits in the P FIFO registers in parallel and perform a computation operation based on the P data elements.

It should be understood that division of the modules in FIG. 1B is merely division of logical functions. In actual implementation, all or some of the modules may be integrated into one physical entity, or the modules may be physically separated. In the embodiments of this application, the receiving module 151 and the sending module 153 may be implemented by the transceiver 302, and the processing module 152 may be implemented by the processor 301. As shown in FIG. 3, the memory controller 300 may include the processor 301, the transceiver 302, and the memory 303. The memory 303 may be configured to store code used by the processor 301 to perform a solution, where the code may be a program/code pre-installed when the memory controller 300 is at delivery.

It should be understood that division of the modules in FIG. 1C and FIG. 1D is merely division of logical functions. In actual implementation, all or some of the modules may be integrated into one physical entity, or the modules may be physically separated. In the embodiments of this application, the receiving module 163 may be implemented by the transceiver 402, and the processing module 162 may be implemented by the processor 401. As shown in FIG. 4, the multi-core processor 400 may include the processor 401, the transceiver 402, and the memory 403. The memory 403 may be configured to store code used by the processor 401 to perform a solution, where the code may be a program/code pre-installed when the multi-core processor 400 is at delivery.

In the foregoing embodiments, the present disclosure may be wholly or partially achieved using software, hardware, firmware, or any combination thereof. When the present disclosure is implemented using a software program, the present disclosure may be wholly or partially achieved in a form of a computer program product. The computer program product includes one or more instructions. When the computer program instructions are loaded and executed on the computer, the procedure or functions in the embodiments of this application are all or partially generated. The computer may be a general-purpose computer, a dedicated computer, a computer network, or another programmable apparatus. The instructions may be stored in a computer storage medium or may be transmitted from a computer storage medium to another computer storage medium. For example, the instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device integrating one or more usable media, such as a server or a data center. The usable medium may be a magnetic medium (for example, a floppy disk, a hard disk, a magnetic tape, or a magneto-optical disk (MO)), an optical medium (for example, a compact disc (CD), a digital versatile disc (DVD), a BLU-RAY disc (BD), or a holographic versatile disc (HVD), a semiconductor medium (for example, a ROM, an erasable programmable ROM (EPROM), an electrically erasable programmable ROM (EEPROM), a non-volatile memory (NAND FLASH), a SSD, or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A multi-core system comprising:
a plurality of cores comprising a first core, wherein the first core comprises an intra-core cache and has an identifier, and wherein the intra-core cache is configured to store prefetched data;
a system memory configured to store prefetching data;
a prefetcher configured to:
generate a prefetching instruction based on historical prefetched data, wherein the prefetching instruction comprises the identifier, a cache bank identifier, and an address of the prefetching data, and wherein the prefetching data are different from the historical prefetched data; and
send the prefetching instruction; and
a memory controller configured to:
receive the prefetching instruction from the prefetcher;
obtain the prefetching data from the system memory according to the prefetching instruction; and
send a message carrying the prefetching data and the cache bank identifier, wherein the first core is configured to:
receive the message from the memory controller; and
write the prefetching data into the intra-core cache.

2. The multi-core system of claim 1, wherein the prefetching instruction further comprises a data length of the prefetching data.

3. The multi-core system of claim 2, wherein the memory controller is further configured to set a memory channel to a busy state after receiving the prefetching instruction.

4. The multi-core system of claim 2, wherein the memory controller is further configured to set a memory channel to an idle state after obtaining the prefetching data.

5. The multi-core system of claim 1, further comprising a multi-core processor and P first in, first out (FIFO) registers, wherein each of the P FIFO registers is configured to store less than or equal to P data elements, and wherein the first core is further configured to write the P data elements of each of the P FIFO registers respectively into the P FIFO registers in response to the multi-core processor needing to perform a computation operation consecutively based on the P data elements of each of the P FIFO registers in the prefetching data.

6. The multi-core system of claim 5, wherein the multi-core processor is configured to:
read different data bits in the P FIFO registers in parallel to obtain the P data elements of each of the P FIFO registers; and
perform the computation operation based on the P data elements of each of the P FIFO registers.

7. The multi-core system of claim 1, wherein the first core is further configured to write the prefetching data into a cache bank identified by the cache bank identifier.

8. The multi-core system of claim 1, wherein the prefetching instruction further comprises an instruction type field differentiating the prefetching instruction from a prestore instruction, a read instruction, and a write instruction.

9. The multi-core system of claim 8, wherein the instruction type field is 2 bits.

10. A method implemented by a multi-core system and comprising:
storing, by an intra-core cache, prefetched data, wherein the multi-core system comprises a plurality of cores comprising a first core, and wherein the first core comprises the intra-core cache and has an identifier;
storing, by a system memory of the multi-core system, prefetching data;
generating, by a prefetcher of the multi-core system, a prefetching instruction based on historical prefetched data, wherein the prefetching instruction comprises the identifier, a cache bank identifier, and an address of the prefetching data, and wherein the prefetching data are different from the historical prefetched data;
sending, by the prefetcher to a memory controller of the multi-core system, the prefetching instruction;
receiving, by the memory controller from the prefetcher, the prefetching instruction;
obtaining, by the memory controller, the prefetching data from the system memory according to the prefetching instruction;
sending, by the memory controller, a message carrying the prefetching data and the cache bank identifier;
receiving, by the first core from the memory controller, the message; and
writing, by the first core, the prefetching data into the intra-core cache.

11. The method of claim 10, wherein the prefetching instruction further comprises a data length of the prefetching data.

12. The method of claim 11, further comprising setting, by the memory controller, a memory channel to a busy state after receiving the prefetching instruction.

13. The method of claim 11, further comprising setting, by the memory controller, a memory channel to an idle state after obtaining the prefetching data.

14. The method of claim 10, further comprising storing, by each of P first in, first out (FIFO) registers of the multi-core system, less than or equal to P data elements.

15. The method of claim 14, further comprising writing, by the first core, the P data elements of each of the P FIFO registers respectively into the P FIFO registers in response to a multi-core processor of the multi-core system needing to perform a computation operation consecutively based on the P data elements of each of the P FIFO registers in the prefetching data.

16. The method of claim 15, further comprising reading, by the multi-core processor, different data bits in the P FIFO registers in parallel to obtain the P data elements of each of the P FIFO registers.

17. The method of claim 16, further comprising performing, by the multi-core processor, the computation operation based on the P data elements of each of the P FIFO registers.

18. The method of claim 10, wherein the method further comprises writing, by the first core, the prefetching data into a cache bank identified by the cache bank identifier.

19. The method of claim 10, wherein the prefetching instruction further comprises an instruction type field differentiating the prefetching instruction from a prestore instruction, a read instruction, and a write instruction.

20. The method of claim 19, wherein the instruction type field is 2 bits.

* * * * *